United States Patent
Tyagi et al.

(10) Patent No.: US 10,569,812 B2
(45) Date of Patent: Feb. 25, 2020

(54) SWING AND DROP TAILGATE

(71) Applicant: Rivian IP Holdings, LLC, Plymouth, MI (US)

(72) Inventors: Sheetanshu Tyagi, Farmington Hills, MI (US); Dwight Brooks, New Boston, MI (US); Brian Gase, Ypsilanti, MI (US); William Kirk Robinson, Ann Arbor, MI (US); Larry Parker, Bloomfield Hills, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

(21) Appl. No.: 16/004,246

(22) Filed: Jun. 8, 2018

(65) Prior Publication Data

US 2019/0375467 A1 Dec. 12, 2019

(51) Int. Cl.
*B62D 33/027* (2006.01)
*B62D 33/037* (2006.01)
*B62D 33/03* (2006.01)

(52) U.S. Cl.
CPC ..... *B62D 33/0273* (2013.01); *B62D 33/0276* (2013.01); *B62D 33/03* (2013.01); *B62D 33/037* (2013.01)

(58) Field of Classification Search
CPC ............ B62D 33/0273; B62D 33/0373; B62D 33/0276; B62D 33/03
USPC .................................................. 296/51, 57.1
See application file for complete search history.

(56) References Cited

U.S. PATENT DOCUMENTS

| | | | |
|---|---|---|---|
| 6,712,418 B1 | 3/2004 | Lathers | |
| 6,893,203 B2 | 5/2005 | Anderson et al. | |
| 7,111,884 B2 | 9/2006 | Johnson | |
| 2004/0183326 A1* | 9/2004 | Tegtmeier | B62D 33/0273 296/62 |
| 2006/0125270 A1* | 6/2006 | Madlinger | B62D 33/03 296/57.1 |
| 2008/0191507 A1* | 8/2008 | Farber | B60P 1/4421 296/57.1 |
| 2014/0054339 A1 | 2/2014 | Smith | |
| 2017/0291551 A1* | 10/2017 | Krajenke | B62D 33/0273 |
| 2019/0185074 A1* | 6/2019 | Morley | B62D 33/037 |

OTHER PUBLICATIONS

Dual Action Tailgate. 2018 Honda Ridgeline. Available online at http://owners.honda.com/vehicles/information/2018/Ridgeline/features/Dual-Action-Tailgate/2.

(Continued)

*Primary Examiner* — Jason S Morrow
(74) *Attorney, Agent, or Firm* — Haley Guiliano LLP

(57) ABSTRACT

A swing and drop tailgate is configured to undergo two distinct motions, each with advantages depending on circumstances. The swing and drop tailgate can undergo a rotation motion about a hinge, as well as a swing down motion via a linkage. The swing down motion allows closer access to the bed, and extends less far from the rear of the vehicle as compared to the drop motion. The motions may be manually controlled, or actuator controlled. One or more latches may constrain motion, or prevent, of the tailgate. A tailgate assembly may include a post assembly and a tailgate, that may move together as a rigid body when dropping, or move relative to one another when swinging.

21 Claims, 13 Drawing Sheets

(56) References Cited

OTHER PUBLICATIONS

Screen shot (at 0:22 seconds) from Suzuki X-HEAD concept car at Tokyo Motor Show 2007. Available online at https://youtu.be/A-6A4ZvVhpk.
2008 Honda Ridgeline Brochure. Available online at http://www.auto-brochures.com/makes/Honda/Ridgeline/Honda_US%20Ridgeline_2008.pdf.

* cited by examiner

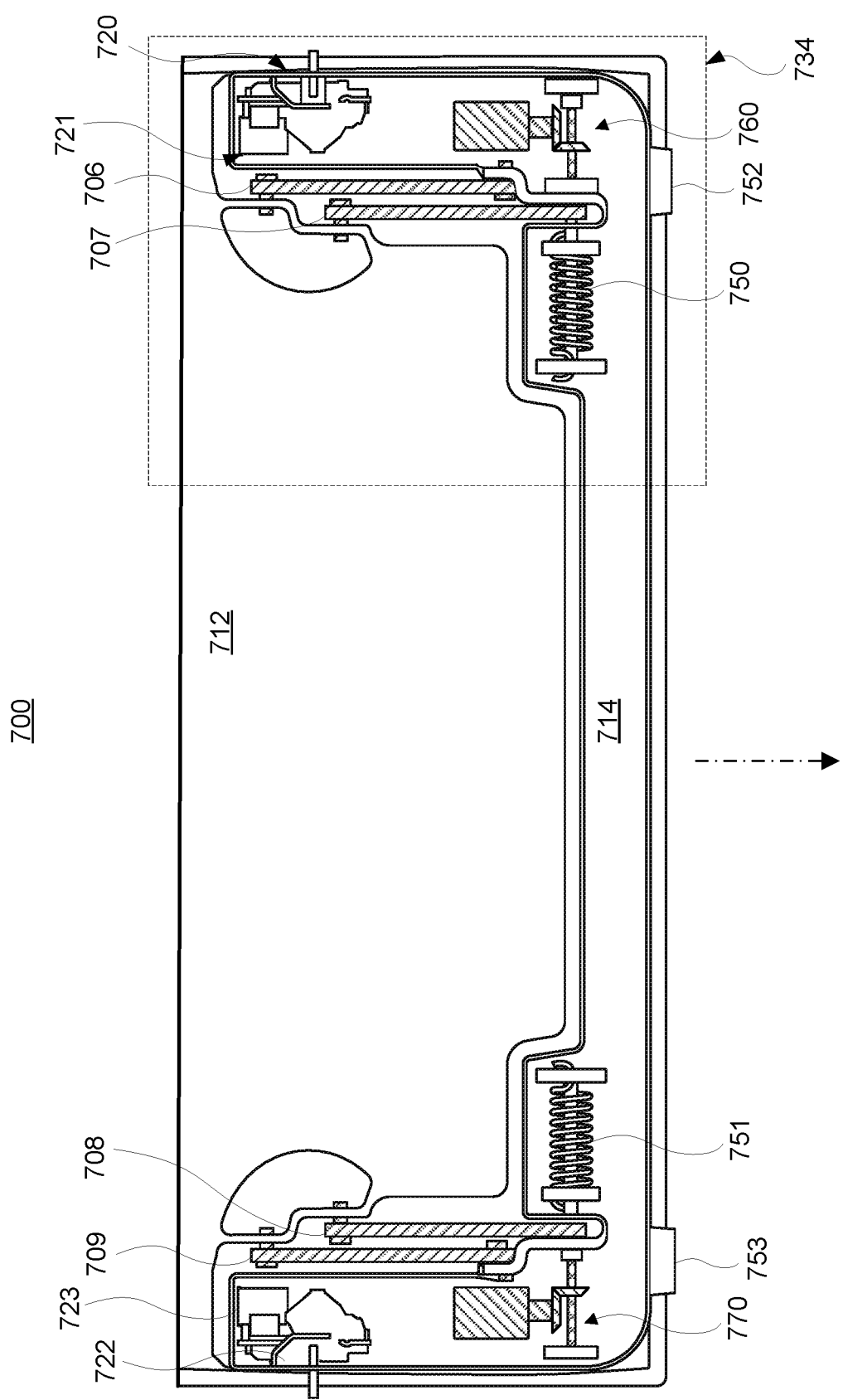

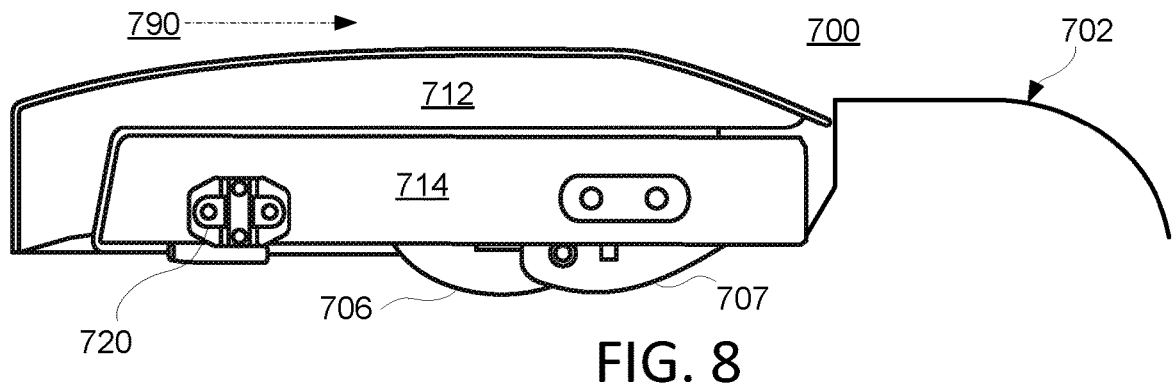
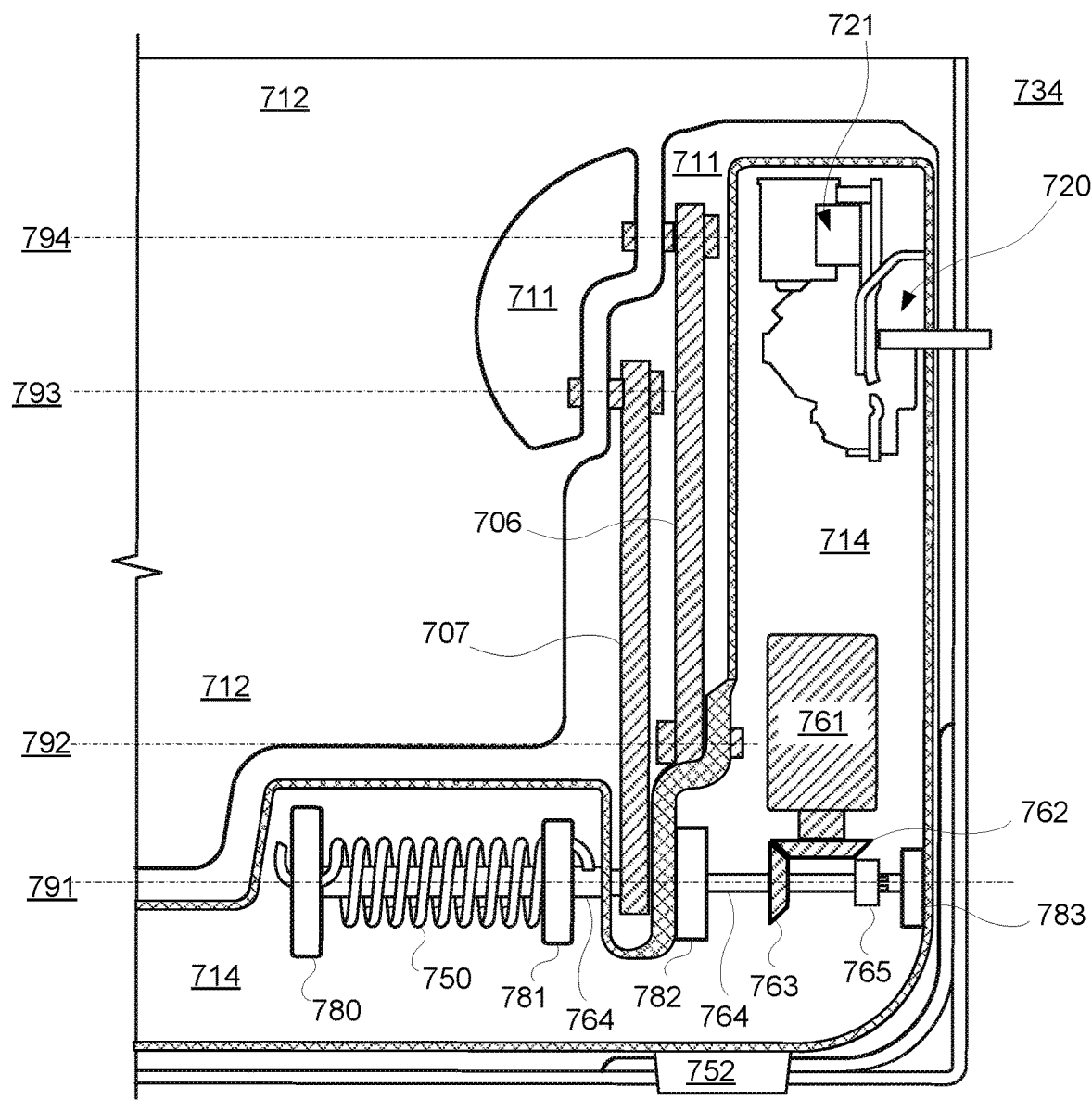

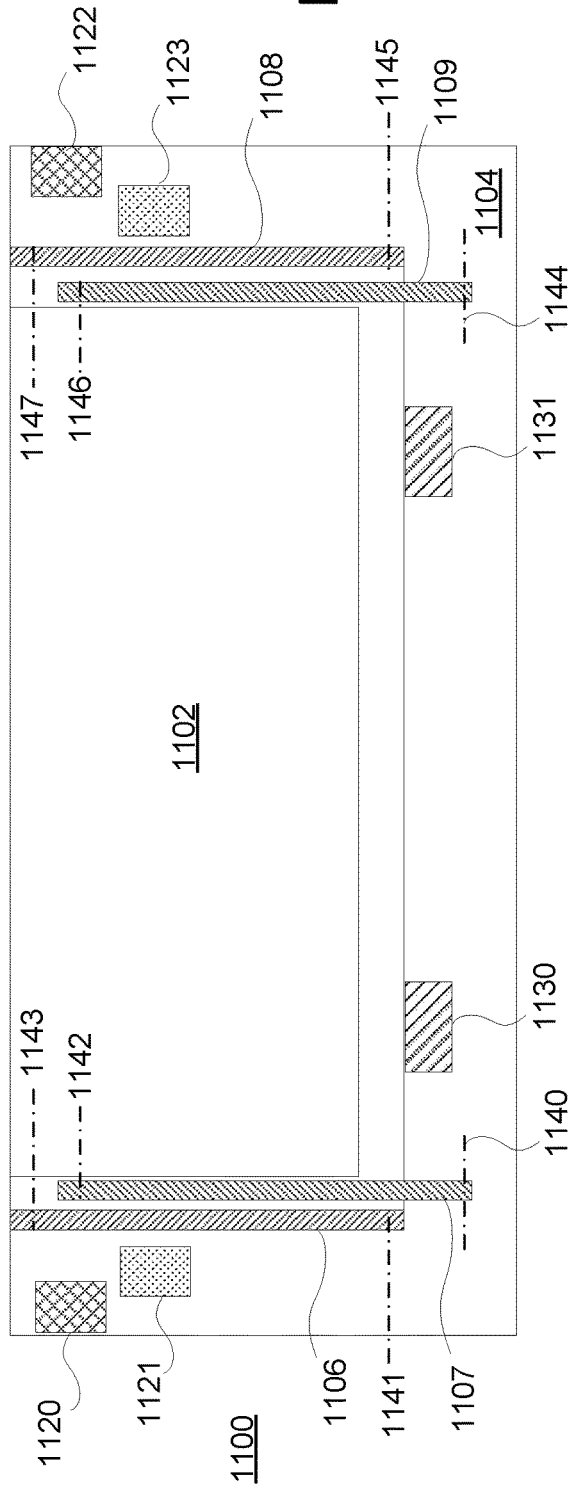
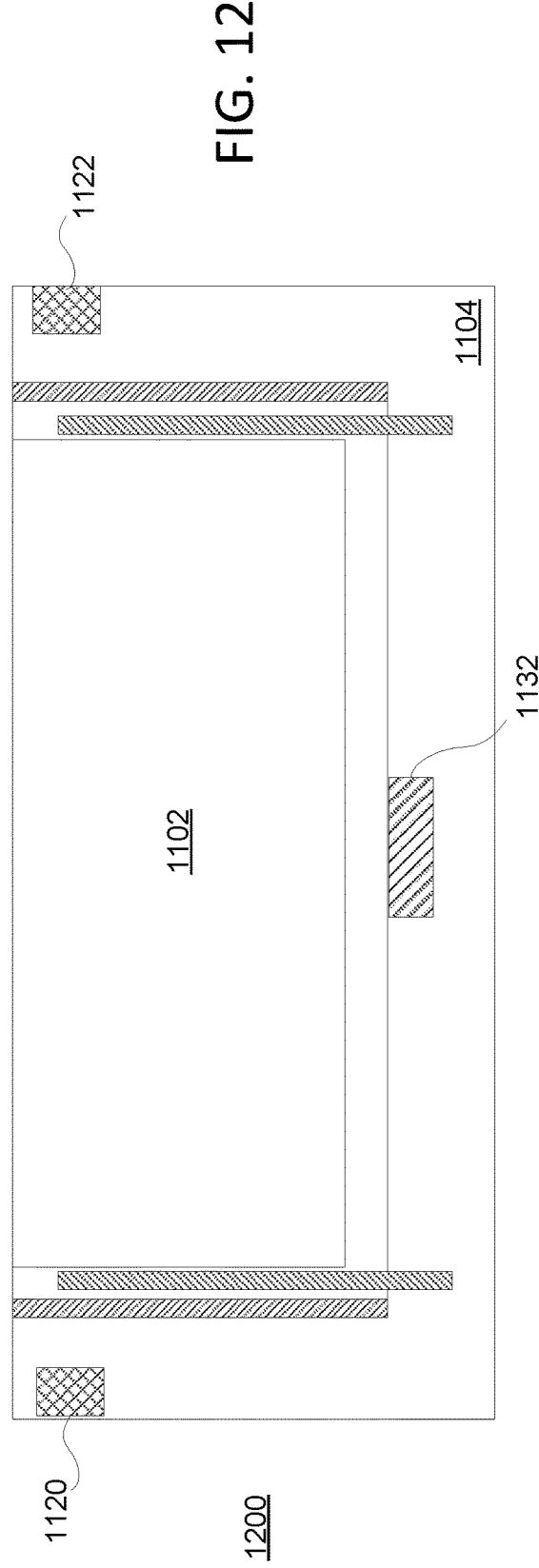

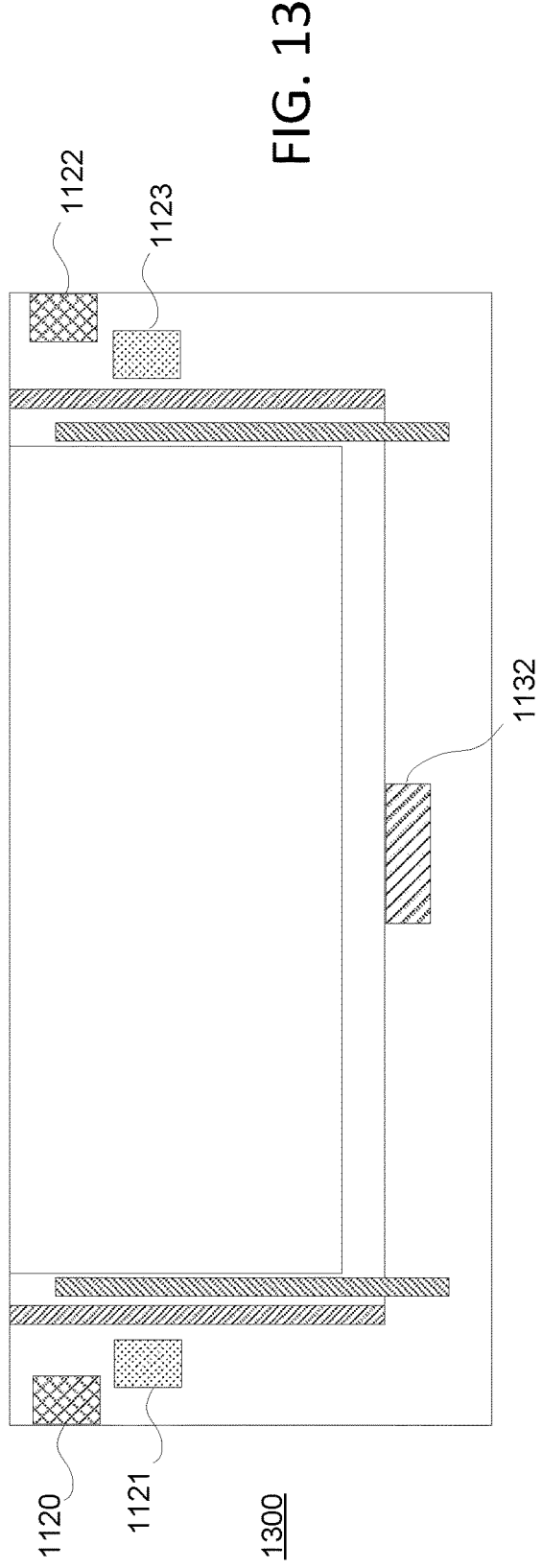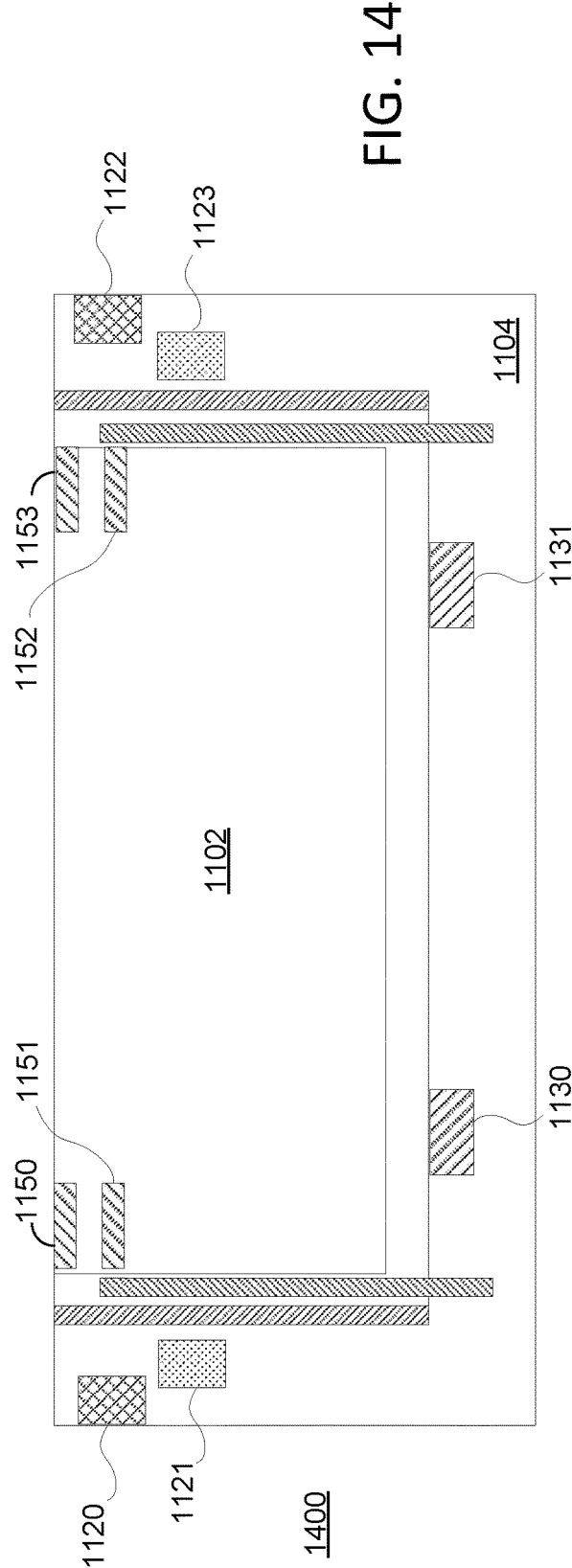

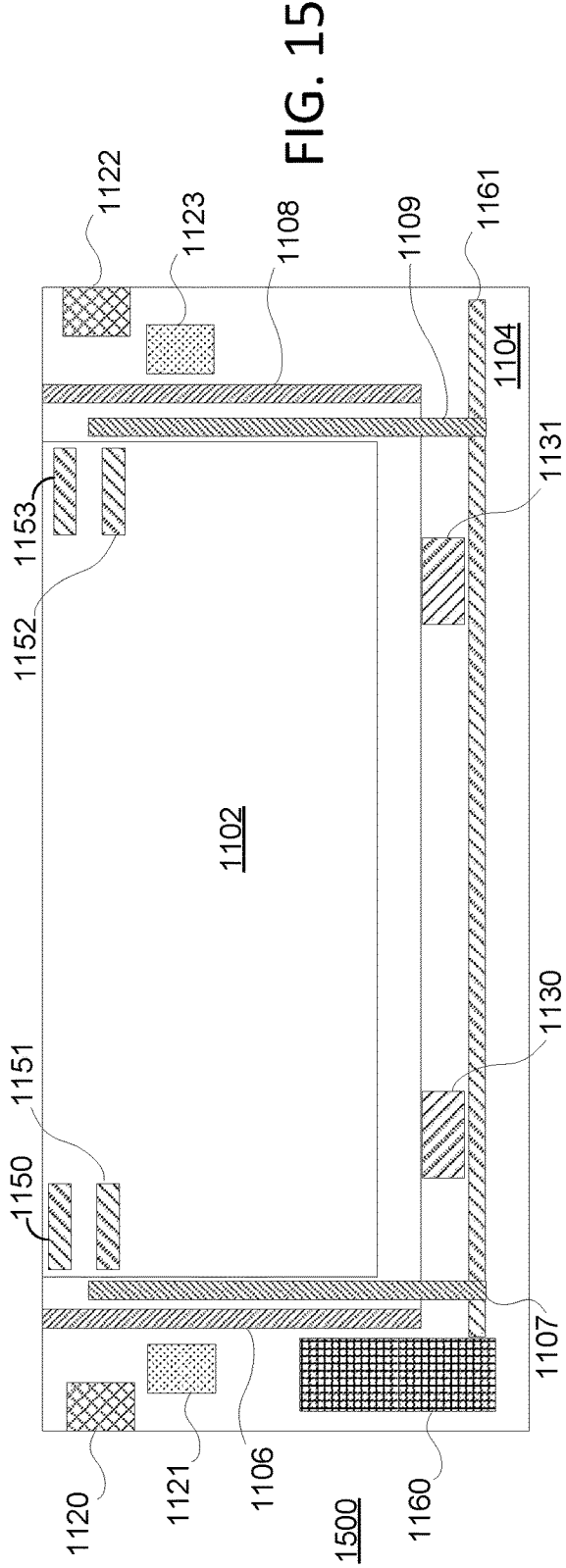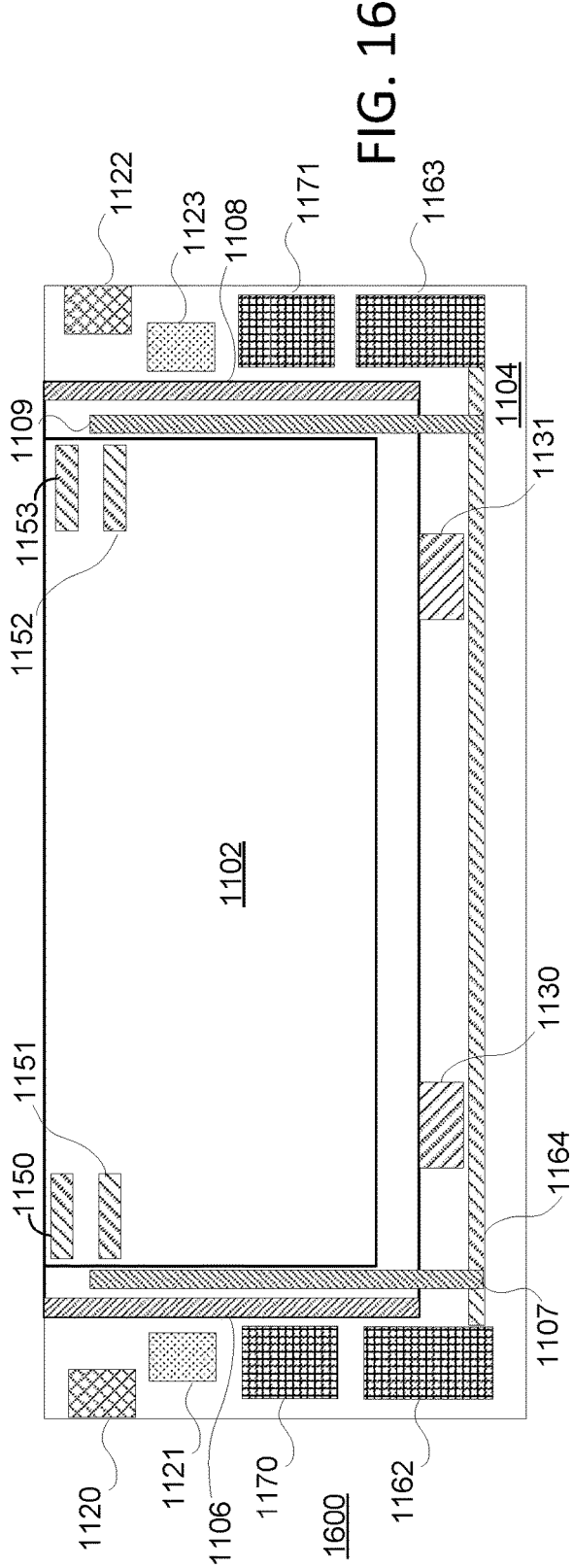

SWING AND DROP TAILGATE

The present disclosure is directed to a tailgate assembly that may undergo more than one motion.

BACKGROUND

Vehicle tailgates typically open using a single trajectory to allow access to the rear cargo area. For example, a truck tailgate typically drops down by rotating about a hinge to allow access to the truck bed. The dropped tailgate allows a user to increase horizontal work space, storage space, or provide a platform for climbing into the bed. One drawback to this motion is that the tailgate now protrudes rearward of the vehicle, blocking the user from standing closer to the vehicle. Other motions of a tailgate, such as a side-hinged tailgate that opens to the side may allow a user to stand closer to the vehicle, but this motion requires significant clearance and does not allow the increased horizontal space that the dropped down tailgate provides. It would be desirable for a tailgate to be capable of more than one motion, along more than one trajectory, to more conveniently adapt to a user's needs.

SUMMARY

A swing and drop tailgate assembly is configured to undergo more than one motion to provide access to a cargo space, for example. For example, a tailgate assembly may be arranged at a boundary of the cargo space (e.g., the rear of a vehicle bed), and is configured to undergo the more than one motion to allow access to the cargo space.

A tailgate assembly includes a post assembly configured to be coupled to a vehicle by a hinge, in which the post assembly is configured to rotate about a first axis of the hinge relative to the vehicle. The tailgate assembly includes at least one first latch that that is configured to lock the post assembly to the vehicle. The tailgate assembly includes a tailgate that is coupled to the post assembly by at least one four-bar linkage, wherein the tailgate is configured to swing relative to the post assembly. The tailgate assembly also includes at least one second latch configured to lock the post assembly and the tailgate together as a substantially rigid body capable of rotating about the hinge.

In some embodiments, the at least one four-bar linkage includes a double rocker linkage, which includes two rocker arms. A respective axis of rotation of each of the two rocker arms is substantially parallel with the first axis of the hinge (e.g., about which rotation of the tailgate assembly may occur).

In some embodiments, the post assembly is configured to rotate about the first axis of the hinge to a first lower position, and the tailgate is configured to swing relative to the post assembly to a second position. For example, the tailgate has a corresponding centroid, and the centroid of the tailgate in the second position is lower than the centroid of the tailgate in the first lower position. To illustrate, in some embodiments, the second position achieved from swinging places the tailgate even lower than the first lower position from rotating. In a further example, the tailgate is oriented horizontal, or near horizontal, in the first lower position, and the tailgate is oriented vertical, or near vertical in the second position.

In some embodiments, the post assembly is configured to rotate about the first axis of the hinge to a first lower position, and the tailgate is configured to swing relative to the post assembly to a second position relative to the post assembly. The tailgate is configured to achieve a third lower position, corresponding to the post assembly achieving the first lower position and the tailgate achieving the second position relative to the post assembly. For example, the tailgate has a corresponding centroid, and when in the third lower position, the tailgate is oriented substantially horizontal and the centroid of the tailgate is lower than when in the first lower position.

In some embodiments, the tailgate assembly includes at least one actuator configured to actuate the at least one four-bar linkage to cause the tailgate to swing relative to the post assembly. For example, in some embodiments, the at least one actuator is configured to be controlled by control circuitry. In a further example, the tailgate assembly includes a pushbutton electrically coupled to the control circuitry. Accordingly, the at least one actuator is further configured to be controlled by the control circuitry based at least in part on the pushbutton being pressed. In some embodiments, the tailgate assembly includes at least one sensor configured to sense a position of the post assembly relative to the vehicle. Further, the at least one actuator is further configured to be controlled by the control circuitry based at least in part on the sensed position.

In some embodiments, the tailgate assembly includes at least one torsion spring configured to provide a pre-load torque at at least one interface between two links of the at least one four-bar linkage. In some embodiments, the tailgate assembly includes at least one cinch actuator configured to aid in locking the post assembly and the tailgate together. In some embodiments, the tailgate includes at least one rotational dampener configured to dampen a motion of the at least one four-bar linkage. In some embodiments, the tailgate assembly includes at least one rotational dampener configured to dampen a motion about the hinge.

In some embodiments, a method for controlling the tailgate assembly may include swinging the tailgate about the at least one four-bar linkage when the second latch is unlocked and the first latch is locked. In some embodiments, the method includes determining, using control circuitry, that the first latch is locked. In some embodiments, the method includes rotating the tailgate assembly about the first axis of the hinge when the second latch is locked and the first latch is unlocked. In some embodiments, the method includes determining that the second latch is locked, and rotating the tailgate assembly about the first axis of the hinge is based at least in part on the determining that the second latch is locked. In some embodiments, the method includes receiving a command to rotate the post assembly about the hinge, and rotating the post assembly about the hinge further includes actuating at least one actuator configured to actuate the hinge. In some embodiments, the method includes receiving a command to swing the tailgate about the at least one four-bar linkage, and swinging the tailgate about the four-bar linkage further includes actuating at least one actuator configured to actuate the four-bar linkage.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

FIG. 7 shows a cross section view of a tailgate assembly, in accordance with some embodiments of the present disclosure;

FIG. 8 shows a side view of a tailgate assembly, in accordance with some embodiments of the present disclosure;

FIG. 9 shows an enlarged side view of a portion of the tailgate assembly of FIG. 7, in accordance with some embodiments of the present disclosure;

FIG. 11 shows a schematic front view of an illustrative tailgate assembly, in accordance with some embodiments of the present disclosure;

FIG. 12 shows a schematic front view of an illustrative tailgate assembly, in accordance with some embodiments of the present disclosure;

FIG. 13 shows a schematic front view of an illustrative tailgate assembly, in accordance with some embodiments of the present disclosure;

FIG. 14 shows a schematic front view of an illustrative tailgate assembly, in accordance with some embodiments of the present disclosure;

FIG. 15 shows a schematic front view of an illustrative tailgate assembly, in accordance with some embodiments of the present disclosure;

FIG. 16 shows a schematic front view of an illustrative tailgate assembly, in accordance with some embodiments of the present disclosure;

DETAILED DESCRIPTION

The present disclosure describes a swing and drop tailgate assembly, which allows for dual functionality of the tailgate assembly. For example, the tailgate assembly may achieve a drop configuration similar to a standard tailgate (e.g., rotating about a hinge axis) to allow access to a vehicle cargo space or bed. Additionally, the tailgate assembly may achieve a swing configuration (e.g., using at least one four-bar mechanism) while remaining nearly vertical, allowing the user to stand nearer to the bed, for example. The swing and drop tailgate assembly may allow a user to access the bed, a rear bin in the bottom of the bed, or the side of the bed (e.g., near a wheel well) by dropping the tailgate (e.g., rotating down), or by swinging the tailgate down (e.g., using the four-bar mechanism). A control system may be used, for example, to determine when to activate each motion, when not to activate each motion, to activate each motion via an actuator, or otherwise control operation of the tailgate assembly. A tailgate assembly may be operated in a manual configuration (e.g., without a control system and actuators), an automatic configuration (e.g., with a control system and actuators), or a combination thereof.

In some embodiments, a tailgate assembly may include a post and a tailgate. The post may be configured for mounting components which actuate the swing mechanism, the drop mechanism, or both. In some embodiments, a tailgate assembly may include one or more latches, which may constrain at least one of the motions, allowing the user to activate a dropping motion or swinging motion separately. In some embodiments, a tailgate assembly may be operated (e.g., undergo at least one motion) using control circuitry responding to the pressing of one or more push buttons. For example, when a first push button is pressed by a user, the control system may activate a drop motion, and when a second push button is pressed by a user, the control system may activate a swing motion.

Figure 1:
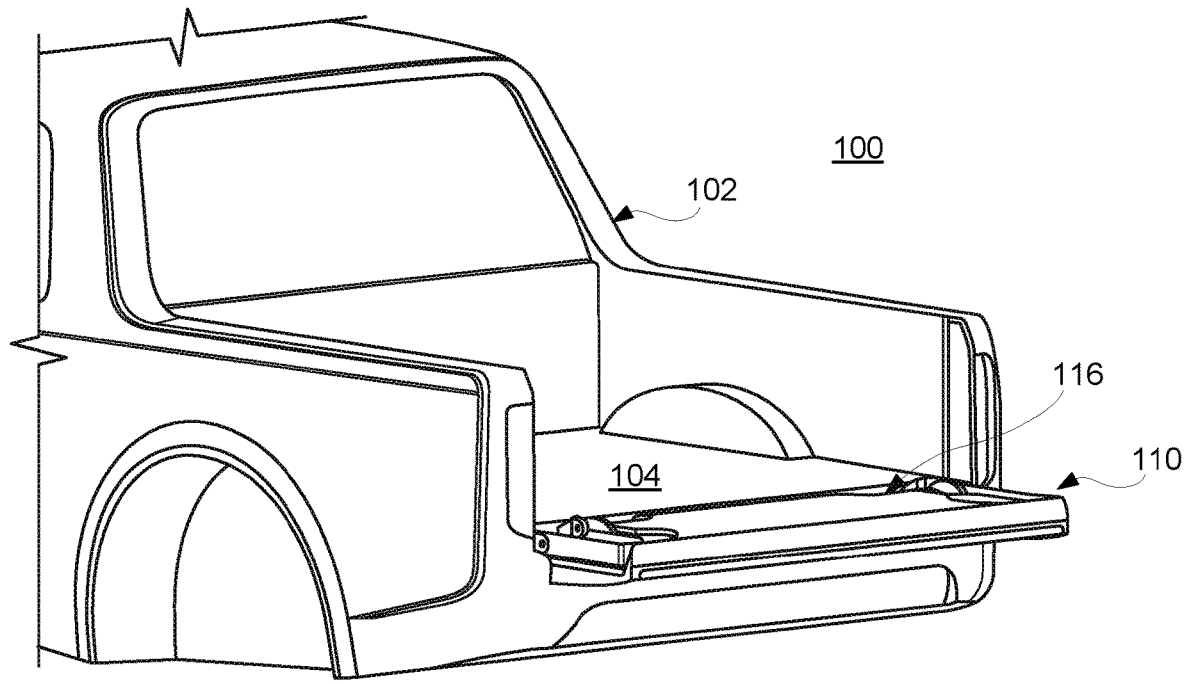
FIG. 1 shows a perspective view of a tailgate assembly of a vehicle in a dropped configuration, in accordance with some embodiments of the present disclosure.
Figure 2:
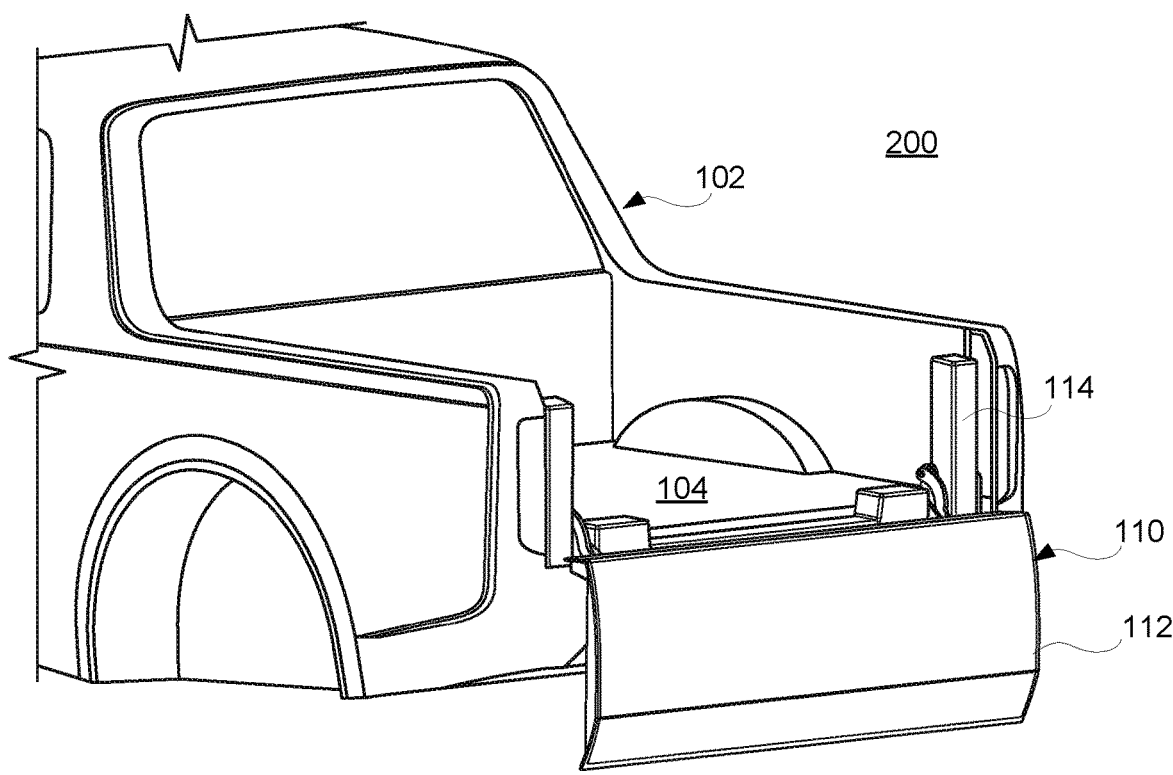
FIG. 2 shows a perspective view of the tailgate assembly of the vehicle of FIG. 1 in a swung down configuration, in accordance with some embodiments of the present disclosure.

FIG. 1 shows a perspective view of tailgate assembly 110 of vehicle 102 in dropped configuration 100, in accordance with some embodiments of the present disclosure. FIG. 2 shows a perspective view of tailgate assembly 110 of vehicle 102 of FIG. 1 in swung down configuration 200, in accordance with some embodiments of the present disclosure. Tailgate assembly 110 includes, for example, tailgate 112 and post assembly 114. Vehicle 102 includes bed 104, which is bounded by tailgate assembly 110 at the rear of vehicle 102.

In some circumstances, when access to, or use of, bed 104 is desired, dropped configuration 100 (i.e., "dropped down") may be preferred by a user. For example, both post assembly 114 and tailgate 112 may rotate about 90° down (e.g., as a rigid body) to open the rear of vehicle 102 for access by a user, as shown by dropped configuration 100. Surface 116 of tailgate assembly 110 may be horizontal when in dropped configuration 100, and accordingly may be used to rest items (e.g., cargo or tools), users (e.g., for a user to sit on), or both. For example, it is sometimes useful to place items on tailgate assembly 110 when dropped down prior to loading the items into bed 104. Further, dropped configuration 100 may be useful when oversized items (e.g., fence posts, re-bar, piping, or a surfboard) are loaded into bed 104, but must overhang the rear of vehicle 102 during driving of vehicle 102.

In some circumstances, when access to, or use of, bed 104 is desired, swung down configuration 200 may be preferred by a user. For example, tailgate 112 may swing down, while post assembly 114 may remain fixed, to open the rear of vehicle 102 for access by a user, as shown by swung down configuration 200. It is sometimes useful, for example, for a user to be able to stand closer to vehicle 102 to access bed 104 than would be possible in dropped configuration 100. Swung down configuration 200 may allow closer access. For example, a cargo hatch, tool bin, spare wheel, or other feature in the floor of bed 104 may be more easily accessed by a user with tailgate assembly 110 in swung down configuration 200 as opposed to dropped configuration 100. Further, swung down configuration 200 may be useful when oversized items (e.g., fence posts, re-bar, piping) are loaded into bed 104, but must overhang the rear of vehicle 102 during driving of vehicle 102. In a further example, tailgate assembly 110 may be actuated into swung down configuration 200 while vehicle 102 is moving to provide increased aerodynamic drag on vehicle 102 (e.g., to assist braking or otherwise slow vehicle 102). In a further example, in circumstances in which space to the rear of vehicle 102 is limited (e.g., in a parking lot), swing down configuration 200 may be preferred to dropped configuration 100 as the total length of vehicle 102 may be relatively shorter (e.g., tailgate assembly 110 does not stick out as far from the rear of bed 104).

Figure 3:
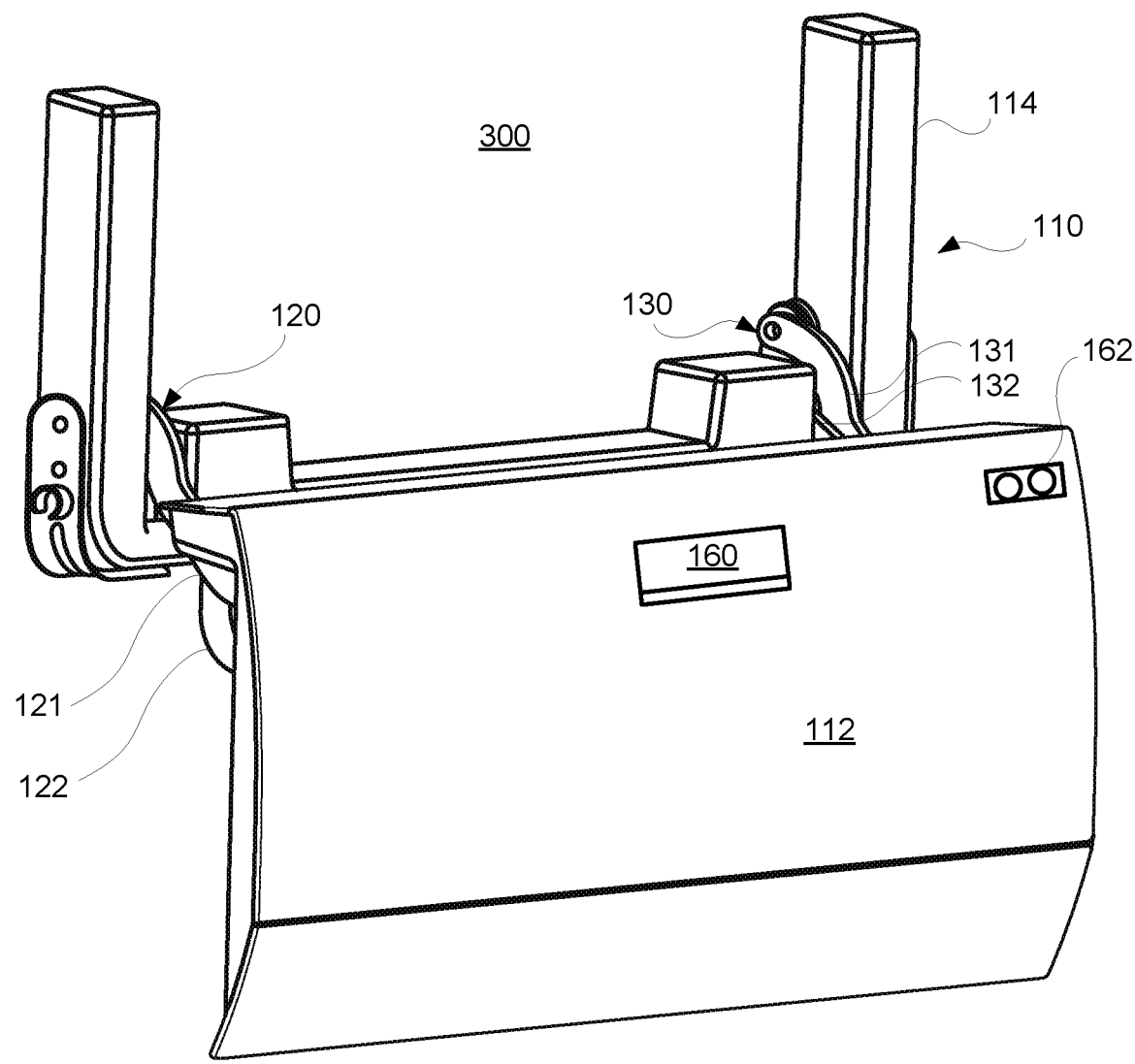
FIG. 3 shows a perspective view of the tailgate assembly of FIG. 1 in a swung down configuration, in accordance with some embodiments of the present disclosure.

FIG. 3 shows a perspective view of tailgate assembly 110 in swung down configuration 300, in accordance with some embodiments of the present disclosure. The rest of vehicle 102 is not shown in FIG. 3 for clarity. Four-bar linkage 120 and four-bar linkage 130 couple tailgate 112 on either respective side to post assembly 114. Four-bar linkage 120 includes links 121 and 122 which connect tailgate 112 to post assembly 114. Four-bar linkage 130 includes links 131 and 132 which connect tailgate 112 to post assembly 114.

In some embodiments, tailgate assembly 110 may include handle 160 (e.g., as part of tailgate 112 as shown in FIG. 3), which may include a latch, a lock, a handle, or hardware for managing motion of tailgate assembly 110, or just tailgate 112. Handle 160 may be used, for example, to de-latch tailgate assembly 110, allowing a drop motion. In a further example, handle 160 may provide a place for a user to grip tailgate assembly 110 to user-actuate a drop motion. In a further example, handle 160 may provide a place for a user to grip tailgate 112 to user-actuate a swing motion. In some embodiments, tailgate assembly 110 may include one or more push button 162, which a user may push to activate one or more motions of tailgate assembly 110, or tailgate 112. Push button 162 may include, for example, two buttons, one for lowering tailgate 112 in a swing motion, and one for raising tailgate 112 in a swing motion. For example, push button 162 may be wired to control circuitry, which may actuate one or more actuators to effect motion of tailgate assembly 110 or tailgate 112.

Figure 6:
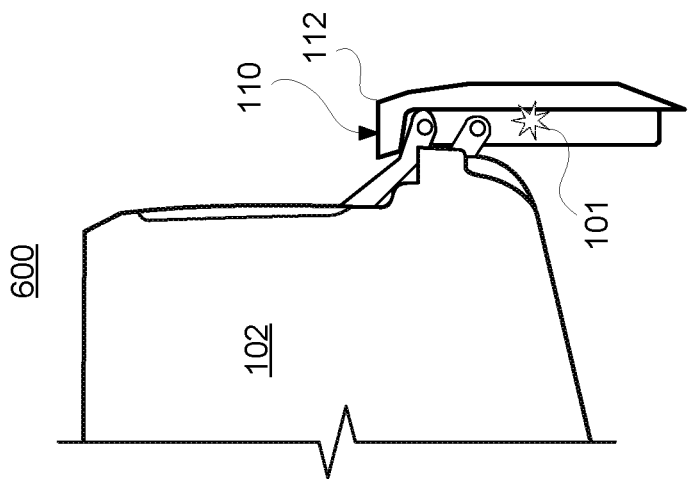
FIG. 6 shows a side view of the tailgate assembly of FIG. 4 in a fully swung down configuration, in accordance with some embodiments of the present disclosure.
Figure 5:
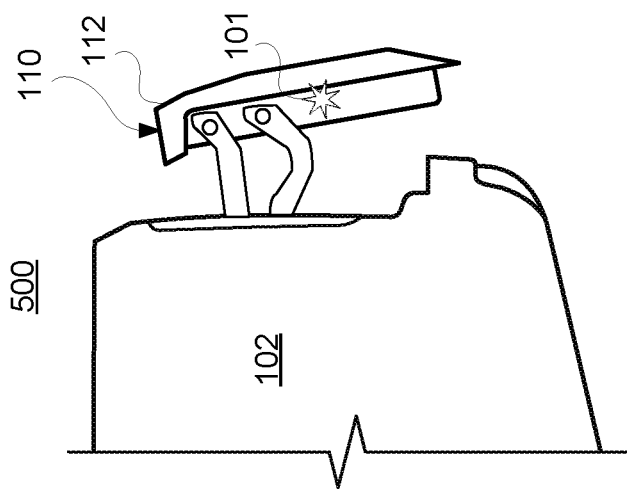
FIG. 5 shows a side view of the tailgate assembly of FIG. 4 in a partially swung down configuration, in accordance with some embodiments of the present disclosure.
Figure 4:
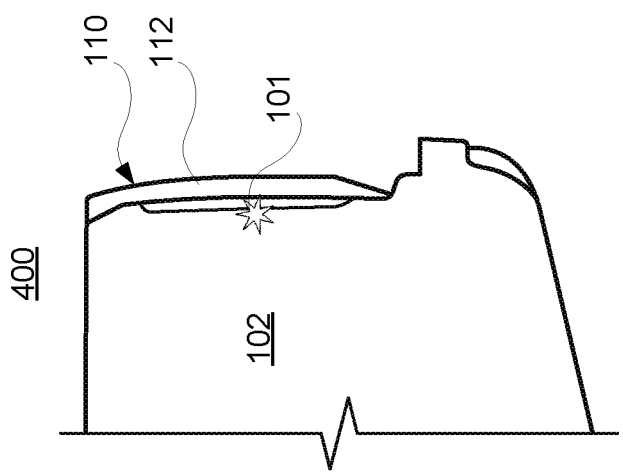
FIG. 4 shows a side view of a tailgate assembly in a closed configuration, in accordance with some embodiments of the present disclosure.

FIG. 4 shows a side view of tailgate assembly 110 in closed configuration 400, in accordance with some embodiments of the present disclosure. FIG. 5 shows a side view of tailgate assembly 110 in partially swung down configuration 500, in accordance with some embodiments of the present disclosure. FIG. 6 shows a side view of tailgate assembly 110 in fully swing down configuration 600, in accordance with some embodiments of the present disclosure. FIGS. 4-6 show only a rear portion of vehicle 102, for purposes of clarity.

Closed configuration 400 may refer to a configuration having one or more latches locked, such that tailgate assembly 110 provides a rear boundary to bed 104, and would not be expected to move relative to bed 104 (i.e., locked in place). In closed configuration 400, tailgate 112 is positioned vertical, or nearly vertical, and may be secured to a post assembly (not shown in FIGS. 4-6).

Partially swung down configuration 500 may include tailgate 112 at an intermediate position between closed configuration 400 and fully swung down configuration 600. For example, partially swung down configuration 500 may be a transient position of tailgate 112 as it moves from closed configuration 400 to fully swung down configuration 600. In some embodiments, partially swung down configuration 500 may be a steady, or quasi-steady position of tailgate 112. For example, tailgate 112 may be positioned, and secured, into partially swung down configuration 500 to extend the cargo length of bed 104 (e.g., if cargo were just longer than the length of bed 104 when tailgate 112 is in closed configuration 400). In some embodiments, a detent (e.g., a mechanical ratchet or other feature) may be included to wholly, or partially, discretize the swinging motion. For example, a detent may provide positional stability of tailgate 112 in partially swung down configuration 500.

Fully swung down configuration 600, which is similar to swung down configuration 200 of FIG. 2, may represent the lower end of travel of tailgate 112 when undergoing a swinging motion. Accordingly, a mechanical hard stop, a detent, a cable, or other constraint to the swinging motion may be included in vehicle 102 to define fully swung down configuration 600.

Referencing FIGS. 4-6, centroid 101 of tailgate 112 represents the center of volume of tailgate 112 (e.g., the geometric center). Centroid 101 is at a lower position in fully swung down configuration 600 than closed configuration 400, indicating that tailgate 112 has moved to a lower position. Accordingly, if tailgate assembly 110 were in a fully dropped down position (dropped configuration 100 of FIG. 1), centroid 101 would be position somewhere lower than in closed configuration 400, but higher than in fully swung down configuration 600.

FIG. 7 shows a cross section view of a tailgate assembly 700, in accordance with some embodiments of the present disclosure. Tailgate assembly 700 is similar to tailgate assembly 110 of FIGS. 1-6. Tailgate assembly 700 includes tailgate 712, post assembly 714, a first linkage including links 706 and 707, a second linkage including links 708 and 709, actuator assembly 760, actuator assembly 770, torsion springs 750 and 751, hinges 752 and 753, first latches 720 and 722, and second latches 721 and 723.

Tailgate assembly 700 may be configured to rotate (e.g., undergo a dropping motion) about hinges 752 and 753, which may be coupled to a vehicle bed, when first latches 720 and 722 are open/released. Second latches 721 and 723, when closed, constrain tailgate 712 and post assembly 714 to move as a rigid body when undergoing dropping motion.

Tailgate assembly 700 may be configured to swing relative to post assembly 714, about the first and second linkages, when second latches 721 and 723 are open/released. Tailgate 712, as shown in FIG. 7, may swing down (i.e., direction 790 as shown in FIG. 7) relative to post assembly 714 when undergoing a swinging motion. Links 706, 707, 708, and 709 rotate at one respective end about a respective pivot on post assembly 714, and at the other respective end about another respective pivot on tailgate 712.

Actuator assemblies 760 and 770, as shown, each include an electric motor, a shaft coupled to the electric motor via a bevel gear set, and bearings to constrain motion of respective shafts. Links 707 and 708 are coupled to respective shafts of actuator assemblies 760 and 770, and accordingly may be actuated to rotate by respective motors of actuator assemblies 760 and 770. Torsion springs 750 and 751 may apply a pre-load torque to respective shafts of actuator assemblies 760 and 770. The pre-load torque may be used to counteract torque of the respective motor, counteract a gravitational force to reduce a required motor torque, assist in manual operation, or any suitable combination thereof. Actuator assemblies 760 and 770 may include rotational elements which may include, for example, a rotational damper to dampen rotational motion, an encoder (e.g., a potentiometer, an optical encoder, or a magnetic encoder) to indicate rotational position, torsion springs, any other suitable components, or any combination thereof. For example, torsion springs 750 and 751 may be considered part of respective rotational elements, respective actuator assemblies 760 and 770, or both. Section 734 is enlarged in FIG. 9 to provide additional description of actuator assembly 760, links 706 and 707, primary latch 720 and second latch 721.

FIG. 8 shows a side view of tailgate assembly 700 of FIG. 7, along with a portion (e.g., the rear bumper) of vehicle 702, in accordance with some embodiments of the present disclosure. For clarity, direction 790 is directed downwards (e.g., toward the ground). As shown in FIG. 8, links 706 and 707 need not be straight, and may be any suitable shape to allow a desired trajectory of tailgate 712 relative to post assembly 714, to clear hardware (e.g., latches, handles, cables, etc.), provide structural rigidity, or any combination thereof. First latch 720, as shown illustratively, may be configured to lock tailgate assembly 700 to vehicle 702, and may include, for example, a lock, a handle, a cinch actuator, a sensor. For example, first latch 720 may include a sensor for sensing a distance between tailgate assembly 700 and a portion of vehicle 702, or whether the tailgate assembly 700 is secured.

FIG. 9 shows an enlarged cross section view of a portion of tailgate assembly 700 of FIG. 7, denoted by section 734, in accordance with some embodiments of the present disclosure. As shown in FIG. 9, tailgate 712 is connected to post assembly 714 in part by links 706 and 707 (e.g., there is another linkage of tailgate assembly 700 which is not shown in FIG. 9). Link 707 is connected rigidly to shaft 764, configured to rotate about axis 791 at one end of link 707. The other end of link 707 is connected to tailgate 712, and is configured to rotate about axis 793. Link 706 is connected rigidly to post assembly 714, configured to rotate about axis 792 at one end of link 706. The other end of link 706 is connected to tailgate 712, and is configured to rotate about axis 794. Tailgate 712 includes depressions 711, which may accommodate hardware (e.g., hinges, links, or rotational elements), at least some of post assembly 714, any other suitable components, or any combination thereof.

Referencing FIG. 9, actuator 761 (e.g., a DC motor as shown illustratively) is rigidly connected to bevel gear 762. Bevel gear 762 engages with bevel gear 763, which is rigidly connected to shaft 764. Accordingly, actuator 761 may actuate link 707 and cause a swinging motion of tailgate 712 when one or more second latches (e.g., second latches 721 and 723) are released. Spring 750 applies a pre-load to shaft 764, while damper 765 dampens rotational motion of shaft 764. As shown in FIG. 9, spring 750 is a wound torsion spring, but any suitable spring may be used in accordance with the present disclosure. For example, a spring may include a beam (e.g., a shaft) that twists in addition to, or place of, a wound torsion spring. Damper 765 may be any suitable rotational damper which may include, for example, a liquid-filled damper, a gas-filled damper, a mechanical damper (e.g., a friction interface), any other suitable damper, or any combination thereof. In some embodiments, a linear damper may be used in addition to, or in place of, a rotational damper. For example, in some embodiments, a linear, gas-filled shock may be used to dampen motion of a tailgate relative to a post assembly, a tailgate assembly relative to a vehicle, or both. Bearings 780, 781, 782, and 783 allow shaft 764 to rotate about axis 791 with a single degree of freedom relative to post assembly 714 (e.g., shaft 764 can only rotate about axis 791).

It will be understood that FIGS. 7-9 are illustrative, and a tailgate assembly may be arranged according to other embodiments. For example, either or both links of a linkage (e.g., links 706 and 707) may be coupled to an actuator. In a further example, one linkage may be actuated by an actuator, and another linkage need not be actuated by an actuator. In a further example, an actuator may be included in a tailgate, a post assembly or both to actuate relative motion.

It will be understood that an actuator may include, be replaced by, or suitably be accompanied by an electric motor, a mechanical spring, a pneumatic actuator, a hydraulic actuator, a linear or rotary actuator, a counterweight, a brake (e.g., a friction generating device), any other suitable component for affecting motion of at least part of a tailgate assembly, or any combination thereof.

It will be understood that a latch may include a mechanical latch (e.g., including a cinch optionally), an electrical latch (e.g., including a cinch with a cinch actuator), a toggle latch (e.g., having shear movement), a clutch system (e.g., or other variable friction system), dentures, detents, magnetic gas damper, lock gas damper, a sensor (e.g., to detect whether the latch is closed), and a powered striker. In some embodiments, a latch may be included as part of a component such as, for example, an actuator, a hinge, a linkage, a handle, a lock, or other component.

In an illustrative example, referencing FIG. 7-9, when a swing motion is requested by a user (e.g., by pushing a button), second latches 721 and 723 release tailgate 712 and actuators (e.g., included in actuator assemblies 760 and 770) drive tailgate 712 to its lowermost (e.g., fully swung down) position. When the user presses another button to close tailgate 712 (e.g., via the four-bar swing mechanism), the actuators drive tailgate 712 to its closed position and cinching latches (e.g., latches with cinching actuators) lock tailgate 712 to post assembly 714. Control circuitry may, for example, swing tailgate 712 until an obstacle is detected, or the end of travel is reached. In some embodiments, tailgate 712 may undergo swinging under purely manual power, purely actuated power, or a combination of manual and actuated power (e.g., an actuator-assisted motion).

Figure 10:
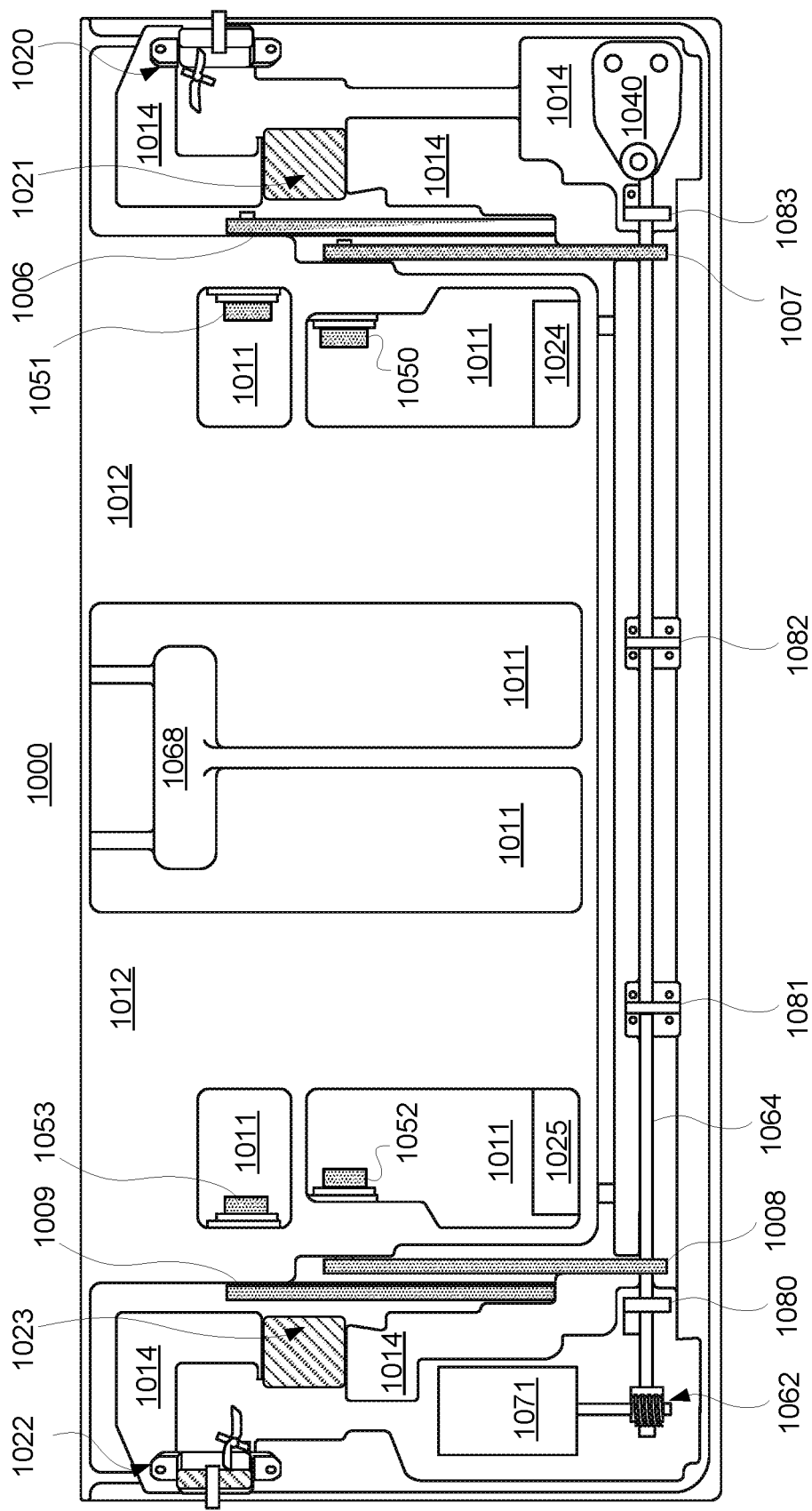
FIG. 10 shows a cross section view of an illustrative tailgate assembly, in accordance with some embodiments of the present disclosure.

FIG. 10 shows a cross section view of illustrative tailgate assembly 1000, in accordance with some embodiments of the present disclosure. Tailgate assembly 1000 differs from tailgate assembly 700, for example, particularly in the arrangement of some hardware. However, the general swinging motion of tailgate 1012 relative to post assembly 1014 is facilitated by two four-bar linkages similar to the motion of tailgate assembly 700. Tailgate 1000 includes tailgate 1012, post assembly 1014, links 1006, 1007, 1008, and 1009, first latches 1020 and 1022, second latches 1021 and 1023, third latches 1024 and 1025, and rotation elements 1050, 1051, 1052, and 1053. Tailgate 1012 includes depressions 1011, which may accommodate hardware, at least some of post assembly 1014, or both. Post assembly 1014 may include hollow portions (e.g., recesses or cutouts), which may house, for example, actuator 1071, cinch actuator 1040, shaft 1064, gear-set 1062 (e.g., a worm drive as illustrated in FIG. 10), and bearings 1080, 1081, 1082, and 1083.

First latches 1020 and 1022 may be configured to secure (e.g., when locked, or closed) tailgate assembly 1000 to a vehicle (not shown in FIG. 10). For example, during a dropping motion of tailgate assembly 1000, first latches 1020 and 1022 may be unlocked or open. Second latches 1021 and 1023 may be configured to secure (e.g., when locked, or closed) tailgate 1012 to post assembly 1014. For example, during a swinging motion of tailgate 1012, second latches 1021 and 1023 may be unlocked or open. Third latches 1024 and 1025 may be configured to secure (e.g., when locked, or closed) tailgate 1012 to post assembly 1014. Third latches 1024 and 1025 are located away from second latches 1022 and 1024, to provide a more rigid coupling of tailgate 1012 and post assembly 1014 when tailgate assembly 1000 is in a closed, or locked, position.

Cinch actuator 1040 may, for example, assist shaft 1064 to achieve a terminal rotational position. For example, as tailgate 1012 undergoes a swinging motion to close (e.g., swinging up from a lowered position), cinch actuator 1040 may assist the last portion of motion and aid in locking shaft 1064. Accordingly, any suitable combination of latches, cinch actuators, and locks may be used in accordance with the present disclosure.

FIGS. 11-18 show schematic representations of illustrative tailgate assemblies. FIGS. 11-14 show illustrative locations of latches, springs, dampers, and linkages (e.g., for manually guided motion). FIGS. 15-18 show illustrative locations of latches, springs, dampers, motors, cinch actuators, and output shafts (e.g., for actuator guided motion). It will be understood that the arrangements of FIGS. 11-18 are merely illustrative, and that any suitable location of components, or combination thereof, may be used in accordance with the present disclosure. The number of, and arrangement of, components may depend on, for example, cost, space, rigidity, clearance, strength, egress, safety, controllability, overall vehicle design, or any combination thereof.

In some embodiments, a four-bar linkage may have tighter assembly tolerances, be of heavier duty construction, or both to ensure a desired stiffness. In some embodiments, the tailgate is designed to have improved stiffness. Additionally, the arrangement of latches in FIGS. 11-18 may impact the stiffness of the respective tailgate assemblies. For example, more latches and larger latches may improve stiffness at the cost of more parts, hardware, and mounts.

FIG. 11 shows a schematic front view of illustrative tailgate assembly 1100, in accordance with some embodiments of the present disclosure. In this context, the "front view" is, for example, the view from inside a bed towards the tailgate assembly. Tailgate assembly 1100 includes tailgate 1102 coupled to post assembly 1104 via two four-bar linkages. The first four-bar linkage includes links 1106 and 1107, while the second four-bar linkage includes links 1108 and 1109. The remaining two links of each four-bar linkage are tailgate 1102 and post assembly 1104. Link 1107 connects to post assembly 1104 at a hinge centered at axis 1140, and to tailgate 1102 at a hinge centered at axis 1142. Link 1106 connects to post assembly 1104 at a hinge centered at axis 1141, and to tailgate 1102 at a hinge centered at axis 1143. Link 1108 connects to post assembly 1104 at a hinge centered at axis 1145, and to tailgate 1102 at a hinge centered at axis 1147. Link 1109 connects to post assembly 1104 at a hinge centered at axis 1144, and to tailgate 1102 at a hinge centered at axis 1146. As shown in FIG. 11, tailgate 1102 is configured to swing down into the page, away from the viewer, in a trajectory governed by the two four-bar linkages. Tailgate 1102 as shown in FIGS. 12-18 are similarly configured to swing down into the page.

Some of the components of FIG. 11 will be shown in tailgate assemblies of FIGS. 12-18. Common components such as tailgate 1102, post assembly 1104, one or more latches, and four-bar links, as well as hinge axes, will not be described for each tailgate assembly as the discussion of FIG. 11 for these components applies to FIGS. 12-18. It will be understood that some components are not shown in FIGS. 11-18, but may be included in a tailgate assembly. For example, bearings (e.g., to constrain a shaft), buttons, handles, hinges, and other hardware may be included in a tailgate assembly, but are not shown in FIGS. 11-18 for purposes of clarity.

As shown in FIGS. 11-18, each four-bar linkage is double rocker type linkage, having four hinge axes. For example, the four-bar linkage including links 1106 and 1107 also includes hinge axes 1140, 1141, 1142, and 1143, about which links 1106 and 1107 rotate (e.g., each link has two ends, resulting in four hinge axes). In a further example, the four-bar linkage including links 1108 and 1109 also includes hinge axes 1144, 1145, 1146, and 1147, about which links 1108 and 1109 rotate (e.g., each link has two ends, resulting in four hinge axes).

First latches 1120 and 1122 are configured to couple tailgate assembly 1100 to a vehicle (not shown), or any other suitable stationary mount. Accordingly, the vehicle, or other stationary mount, may include corresponding latch hardware which may engage with a first latch to provide a constraint to relative motion of a tailgate assembly. For example, first latch 1120 may include a capture, which may be configured to capture a pin of a vehicle to secure tailgate assembly 1100 in a closed position. In a further example, first latch 1120 may include a pin, which may be configured to be captured by a capture of a vehicle to secure tailgate assembly 1100 in a closed position. Accordingly, the term latch as used herein shall refer to a latching mechanism, which may, but need not, require a second component, or feature, to engage with to constrain motion.

Second latches 1121 and 1123 are configured to couple tailgate 1102 to post assembly 1104. Accordingly, post assembly 1104 and tailgate 1102 may include respective, corresponding latch hardware which may engage to provide a constraint to motion of tailgate 1102 relative to post assembly 1104. Accordingly, tailgate 1102, post assembly 1104, or both, may include suitable latching hardware. For example, tailgate 1102 may include a pin, and post assembly 1104 may include a capture configured to capture the pin to provide a constraint to motion of tailgate 1102 relative to post assembly 1104.

Third latches 1130 and 1131 are configured to couple tailgate 1102 to post assembly 1104, but at a different location than second latches 1121 and 1123. Third latches 1130 and 1131 may, for example, provide additional stiffness to the tailgate 1102 and post assembly 1104 coupling during dropping. For example, if only second latches 1121 and 1123 were used in FIG. 11, the bottom portion of the interface between tailgate 1102 and post assembly 1104 (e.g., near third latches 1130 and 1131) may be less stiffly held in place as compared to the top (e.g., near second latches 1121 and 1123). Accordingly, any suitable number of latches may be included in a tailgate assembly to provide sufficient stiffness in the coupling between tailgate 1102 and post assembly 1104, between post assembly 1104 and a stationary mount (e.g., a vehicle), or both. The terms "first latch," "second latch," and "third latch" are illustrative, and are used to differentiate latches for discussion purposes. Any suitable number of types of latches may be used in accordance with the present disclosure.

FIG. 12 shows a schematic front view of illustrative tailgate assembly 1200, in accordance with some embodiments of the present disclosure. While FIG. 11 shows tailgate assembly 1100 having two third latches 1130 and 1131, tailgate assembly 1200 of FIG. 12 includes only one third latch 1132. Tailgate assembly 1200 includes third latch 1132, which is centrally positioned as shown in FIG. 12. Tailgate assembly 1200 includes first latches 1120 and 1122, but no second latches. For example, referencing tailgate assembly 1200, third latch 1132 may provide the only latch to constrain relative motion between tailgate 1102 and post assembly 1104.

FIG. 13 shows a schematic front view of illustrative tailgate assembly 1300, in accordance with some embodiments of the present disclosure. Tailgate assembly 1300 includes first latches 1120 and 1122, second latches 1121 and 1123, and third latch 1132.

FIG. 14 shows a schematic front view of illustrative tailgate assembly 1400, in accordance with some embodiments of the present disclosure. Tailgate assembly 1400 includes first latches 1120 and 1122, second latches 1121 and 1123, third latches 1130 and 1131, and rotation elements 1150, 1151, 1152, and 1153. Each of rotation elements 1150, 1151, 1152, and 1153 may include a spring (e.g., a torsion spring, a clock spring), a damper (e.g., a rotary damper, a linear damper), a detent (e.g., a ratchet), or a combination thereof. Rotation elements 1150, 1151, 1152, and 1153 correspond to (e.g., and may be centered at) axes 1143, 1142, 1147, and 1146, respectively. Any suitable rotation element may be included at respective hinges centered at any of axes 1140, 1141, 1142, 1143, 1144, 1145, 1146, and 1147 as shown in FIG. 11, or a combination thereof. In some embodiments, a spring may apply a torque about a respective hinge between links (e.g., of a four-bar linkage). For example, a spring may be used to aid in counter-acting a gravitational force by pre-loading the hinge joint opposite to the effect of the gravitational force. In some embodiments, a damper may dissipate rotational energy (e.g., into heat) about a respective hinge between links (e.g., of a four-bar linkage). For example, a damper may be used to aid in stabilizing motion of a hinge joint by reducing oscillations which may arise from an impulse. In some embodiments, a detent may fully or partially discretize rotational motion about a respective hinge between links (e.g., of a four-bar linkage). For example, a detent may be used to aid in stabilizing a discreet position of a tailgate (e.g., in a swinging motion), or tailgate assembly (e.g., in a dropping motion), within a suitable range of motion.

FIG. 15 shows a schematic front view of illustrative tailgate assembly 1500, in accordance with some embodiments of the present disclosure. Tailgate assembly 1500 includes tailgate 1102, post assembly 1104, links 1106-1109, first latches, 1120 and 1122, second latches 1121 and 1123, third latches 1130 and 1131, rotation elements 1150-1153, actuator 1160, and shaft 1161. Actuator 1160 may, for example, include a rotary motor, a gearbox, an encoder (e.g., optical, magnetic, or potentiometer-style), any other suitable actuator hardware, or any combination thereof. Shaft 1161 is coupled to actuator 1160, and coupled to links 1107 and 1109 to allow actuator 1160 to actuate motion of links 1107 and 1109 (e.g., to cause a swinging motion of tailgate 1102). For example, in some embodiments, a rotation element (e.g., a spring, a damper, or a detent) may be coupled to shaft 1161 to affect rotational motion of shaft 1161.

FIG. 16 shows a schematic front view of illustrative tailgate assembly arrangement 1600, in accordance with some embodiments of the present disclosure. Tailgate assembly 1600 includes tailgate 1102, post assembly 1104, links 1106-1109, first latches 1120 and 1122, second latches 1121 and 1123, third latches 1130 and 1131, rotation elements 1150-1153, actuators 1162 and 1163, shaft 1164, and cinch actuators 1170 and 1171. Actuators 1162 and 1163 may, for example, each include a rotary motor, a gearbox, an encoder (e.g., optical, magnetic, or potentiometer-style), any other suitable actuator hardware, or any combination thereof. Shaft 1164 is coupled to both actuator 1162 and actuator 1163, and coupled to links 1107 and 1109 to allow actuators 1162 and 1163 to actuate motion of links 1107 and 1109 (e.g., to cause a swinging motion of tailgate 1102).

Cinch actuators 1170 and 1171 are configured to aid in locking post assembly 1104 and the tailgate 1102. In some embodiments, for example, tailgate 1102 may include two respective pins, and post assembly 1104 may include cinch actuators 1170 and 1171 that engages with the respective pins when in proximity to provide a seating force to draw tailgate 1102 and post assembly 1104 together. Any suitable cinch actuator may be used in accordance with the present disclosure. In some embodiments, a cinch actuator may be used as a locking mechanism (e.g., an electronic lock or security lock). In some embodiments, a cinch actuator may operate over a relatively small range of motion of tailgate 1102 during a swinging motion. A cinch actuator may be used to cinch, or "draw together," and two suitable component of a tailgate assembly including a tailgate and a post assembly, a link and a post assembly, a tailgate and a link, a shaft and a post assembly, or any combination thereof. In some embodiments, a cinch actuator may be combined with, or replace, one or more latches.

Figure 17:
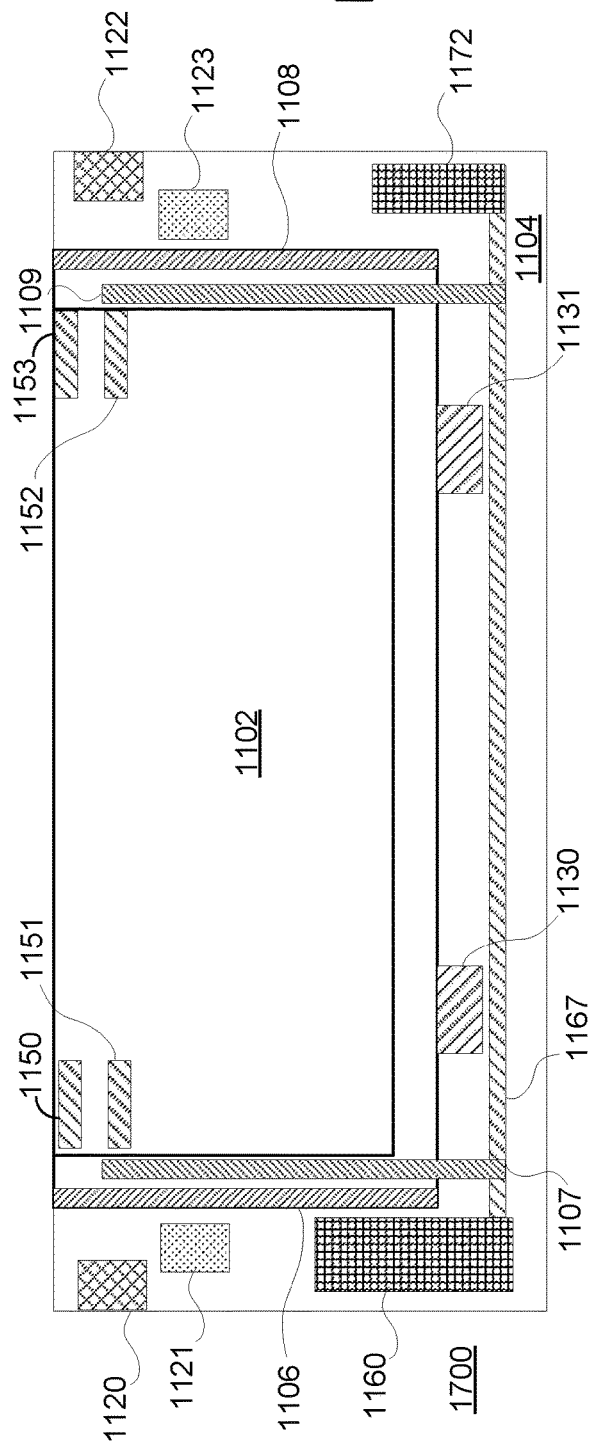
FIG. 17 shows a schematic front view of an illustrative tailgate assembly, in accordance with some embodiments of the present disclosure.

FIG. 17 shows a schematic front view of illustrative tailgate assembly 1700, in accordance with some embodiments of the present disclosure. Tailgate assembly 1700 includes tailgate 1102, post assembly 1104, links 1106-1109, first latches 1120 and 1122, second latches 1121 and 1123, third latches 1130 and 1131, rotation elements 1150-1153, actuator 1160, shaft 1167, and cinch actuator 1172. Actuator 1160 and cinch actuator 1172 are coupled to shaft 1166. Actuator 1160 may provide torque to cause rotational motion of shaft 1166, while cinch actuator 1172 may aid in locking shaft 1167 in a position (e.g., open, closed, or intermediate position).

Figure 18:
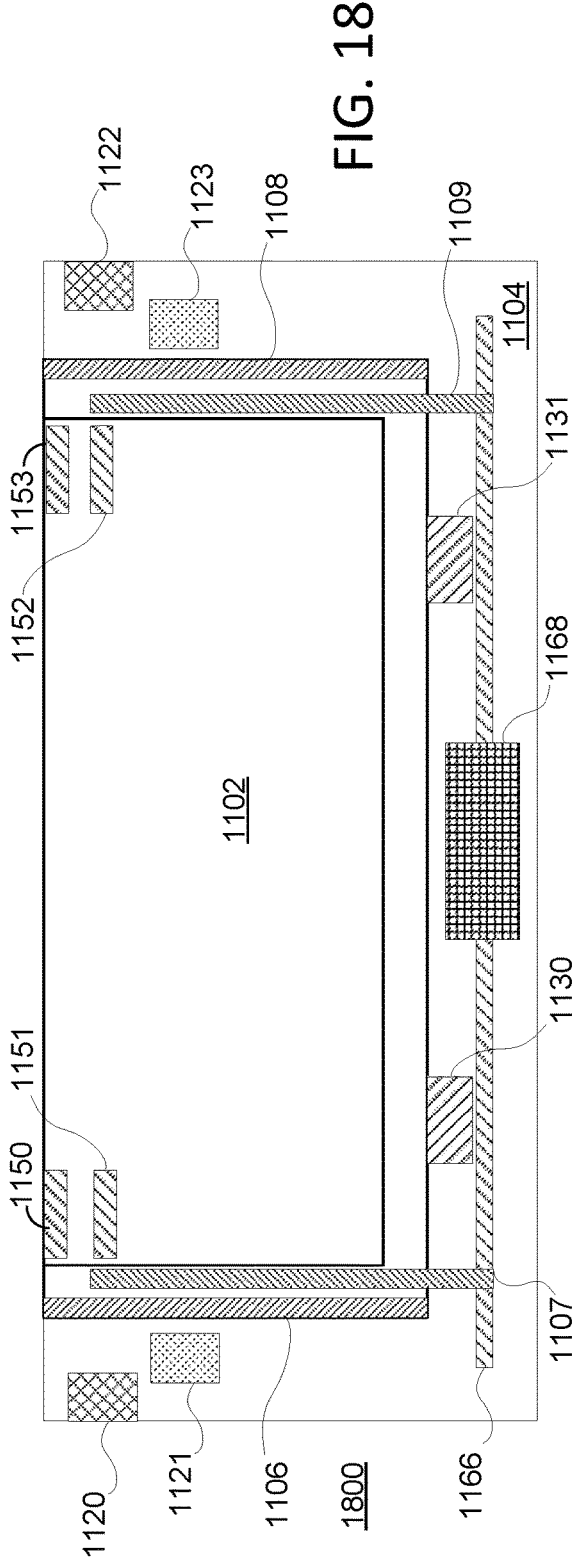
FIG. 18 shows a schematic front view of an illustrative tailgate assembly, in accordance with some embodiments of the present disclosure.

FIG. 18 shows a schematic front view of illustrative tailgate assembly 1800, in accordance with some embodiments of the present disclosure. Tailgate assembly 1800 includes tailgate 1102, post assembly 1104, links 1106-1109, first latches 1120 and 1122, second latches 1121 and 1123, third latches 1130 and 1131, rotation elements 1150-1153, actuator 1168, and shaft 1166. Actuator 1168 is coupled to shaft 1166, which may include one or two shafts as shown in FIG. 18. Actuator 1168 is located at a middle position along shaft 1166, which may, for example, reduce backlash, reduce torsion stress, improve symmetrical loading of the linkages, or make the overall design more symmetrical. Any of first latches 1120 and 1122, second latches 1121 and 1123, third latches 1130 and 1131 may include a cinch actuator, for example, to aid in positively locking suitable components together.

Figure 19:
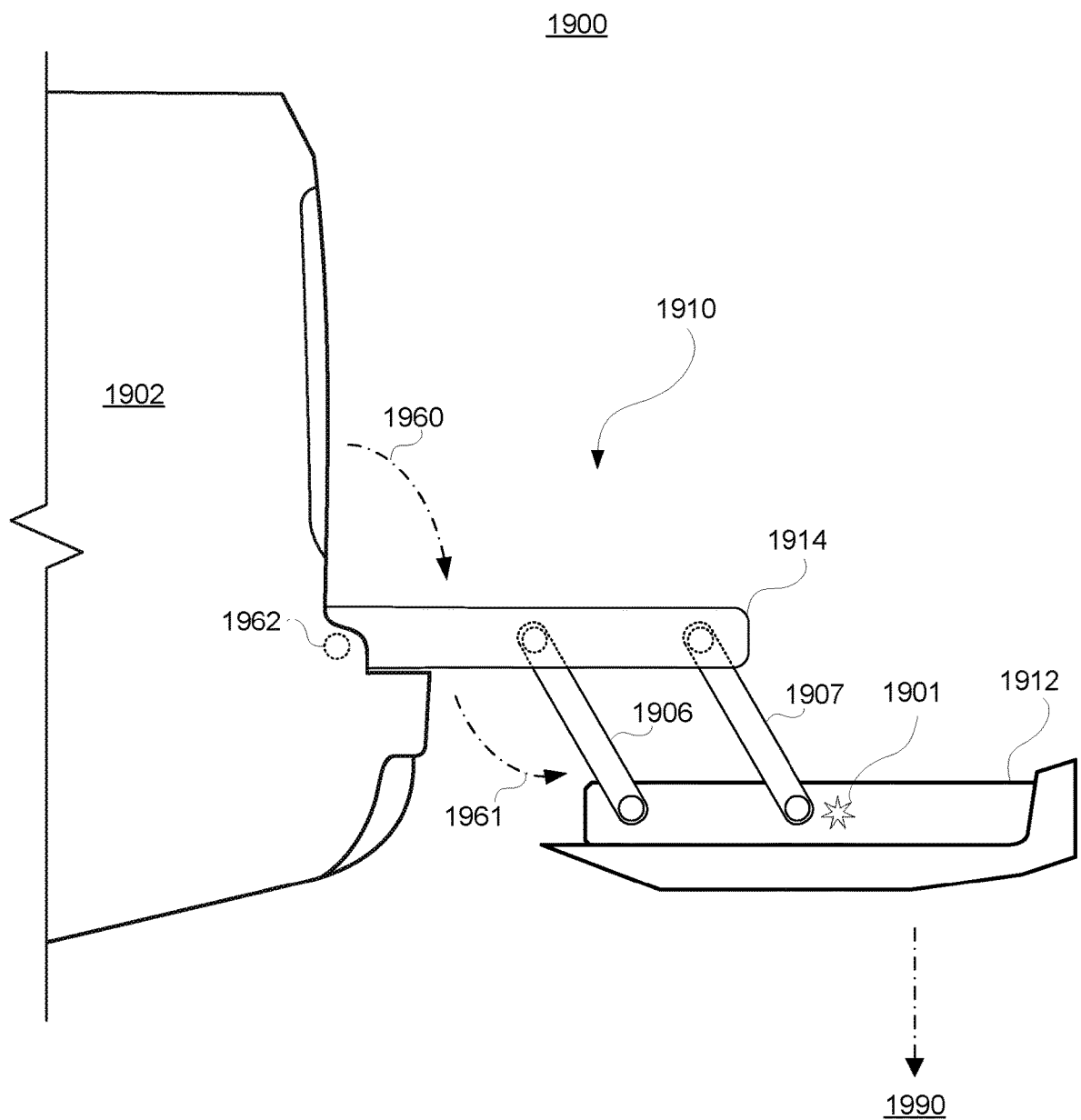
FIG. 19 shows a side view of a tailgate assembly in a third lower position, in accordance with some embodiments of the present disclosure.

In some embodiments, a tailgate assembly may be configured to be used to provide a step, a lift, an adjustable platform, or other horizontal surface, hereinafter referred to as a lifting configuration. In some such embodiments, the tailgate assembly may incorporate two different motions simultaneously to achieve the lifting configuration. FIG. 19 shows a side view of tailgate assembly 1910 in a third lower position (e.g., in lifting configuration 1900), in accordance with some embodiments of the present disclosure. Post assembly 1914 is configured to rotate about hinge 1962 of vehicle 1902 (e.g., shown by motion arrow 1960). Additionally, tailgate 1912 is configured to swing relative to post assembly 1914 (e.g., shown by motion arrow 1961), via links 1906 and 1907, which form a four-bar linkage. As shown in FIG. 19, a far-side linkage is not visible, but it will be understood that a similar four-bar linkage may be included on each side (e.g., driver side and passenger side) of tailgate 1912. Note that axis 1990 is directed downward (e.g., toward the ground) to aid in discussion (e.g., downwards refers to the direction of axis 1990, and upwards refers to the opposite direction).

In some embodiments, an actuator may be used to provide power to the swing motion. For example, tailgate 1912 may be used as a lift, by closing the four-bar link (e.g., moving opposite motion arrow 1961) under actuator power from lifting configuration 1900 to a fully dropped position (e.g., similar to that shown in FIG. 1). In lifting configuration 1900, the tailgate may serve as a step, for example, for a user to step into the bed of vehicle 1902. The lifting configuration may be useful, for example, to raise heavy, ungainly, or multiple items upwards to more easily load into the bed of vehicle 1902.

In some embodiments, lifting configuration 1900 may be achieved by rotating post assembly 1914 to a fully dropped down position, and also swinging tailgate 1912 to a fully swung position. The rotating and swinging may occur in any suitable order, simultaneously, or follow any suitable schedule to achieve lifting configuration 1900 from a fully closed position, a partially or fully dropped down position, a partially or fully swung position, or any suitable combination thereof. For example, control circuitry may control tailgate 1912 to swing only after post assembly 1914 has fully dropped down (e.g., from manually powered, or actuated, motion). Tailgate assembly 1910 is thus capable of a dropping motion and a swinging motion. In an illustrative example, if post assembly 1914 were closed against vehicle 1902, and tailgate 1912 were in a fully swung position (e.g., by rotating tailgate assembly 1910 as a rigid body about hinge 1962 until post assembly 1914 is closed), tailgate 1912 would be positioned upwards relative to post assembly 1914, allowing access to the bed of vehicle 1914 underneath tailgate 1912. Accordingly, tailgate assembly 1910 is thus capable of a dropping motion (e.g., tailgate assembly rotated down as a rigid body), a lifting motion (e.g., post assembly 1914 rotated down, and tailgate 1912 fully swung), and a swinging motion (e.g., post assembly 1914 closed, and tailgate 1912 fully swung resulting in an upward position).

Referencing FIG. 19, centroid 1901 of tailgate 1912 represents the center of volume of tailgate 1912 (e.g., the geometric center). The vertical position of centroid 1901 when tailgate 1912 is fully swung is at a lower position than when either when in the fully dropped down configuration. Centroid 1901 in the fully swung position (e.g., post assembly 1914 closed, tailgate 1912 swung) is higher than in the closed position. Further, centroid 1901 in the fully closed position (e.g., both post assembly 1914 and tailgate 1912 closed) is at a high position than when in the fully dropped position (e.g., post assembly 1914 rotated down, and tailgate 1912 closed against post assembly 1914).

Figure 20:
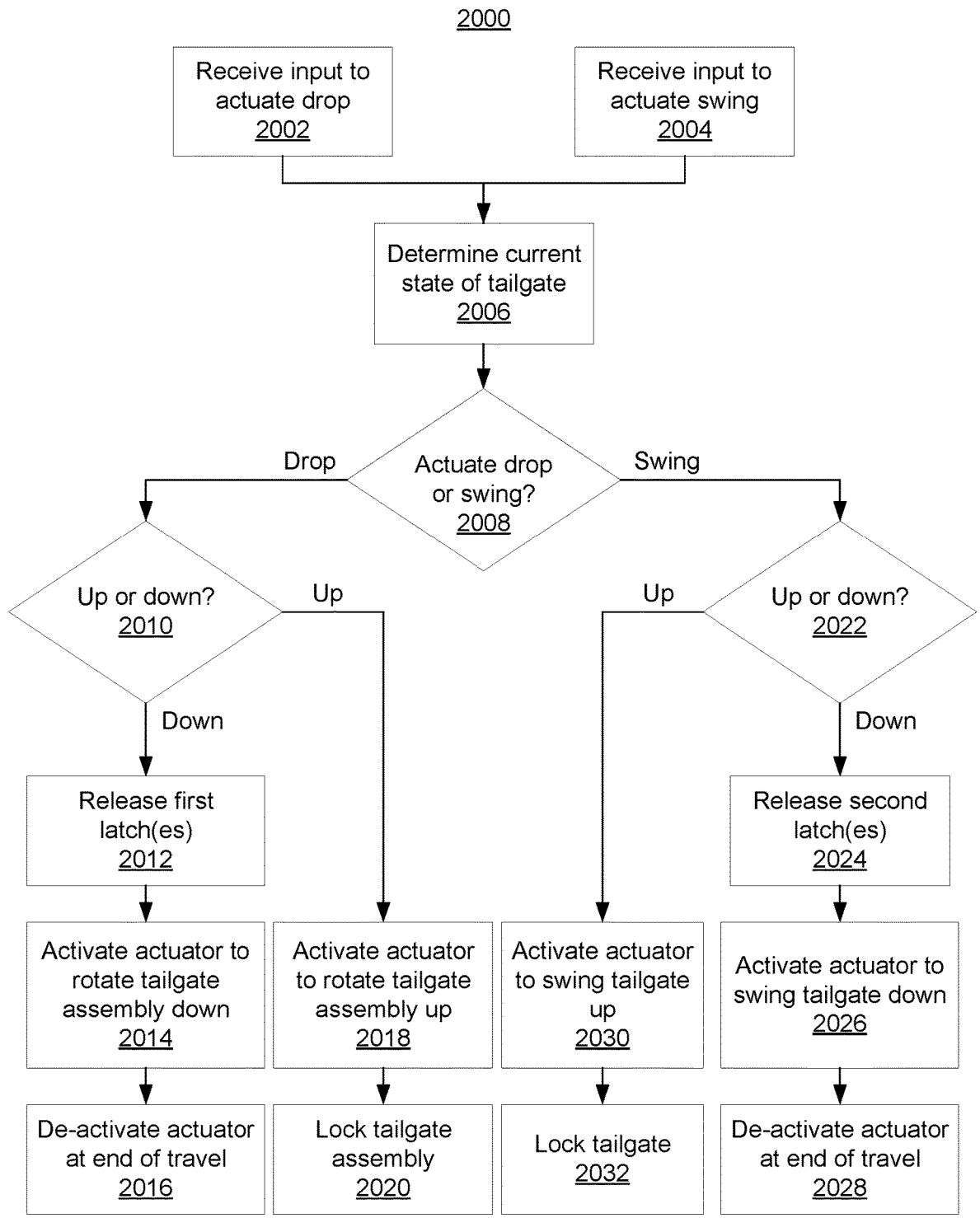
FIG. 20 is a flowchart of an illustrative process for managing motion of a tailgate assembly, in accordance with some embodiments of the disclosure.

FIG. 20 is a flowchart of illustrative process 2000 for managing motion of a tailgate assembly, in accordance with some embodiments of the disclosure. It should be noted that process 2000 or any step thereof could be performed on, or provided by, the system of FIG. 21. In addition, one or more steps of process 1100 may be incorporated into or combined with one or more other steps described herein.

Step 2002 may include control circuitry receiving an input to actuate a drop motion. The input may include, for example, an indication that a button was pressed, a selection by a user, a signal from a key fob, any other suitable input, or any combination thereof. In some embodiments, the control circuitry may receive the input to actuate the drop motion as a signal at one or more IO pins of the control circuitry.

Step 2004 may include control circuitry receiving an input to actuate a swing motion. The input may include, for example, an indication that a button was pressed, a selection by a user, a signal from a key fob, any other suitable input, or any combination thereof. In some embodiments, the control circuitry may receive the input to actuate the swing motion as a signal at one or more IO pins of the control circuitry.

Step 2006 may include control circuitry determining a current state of the tailgate assembly, or portion thereof. A current state of the tailgate may include, for example, a position of a tailgate, a position of a post assembly, a direction of motion of a tailgate, a direction of motion of a post assembly, state of a latch (e.g., open or closed), state of an actuator, state of a cinch actuator, state of a linkage, any other state that the tailgate or tailgate assembly is in, or any combination thereof. For example, one or more electrical switches or contact may be configured to indicate when a tailgate is locked to the post assembly. In some embodiments, the control circuitry may receive input from one or more sensors to indicate the current state of the tailgate assembly or portion thereof. For example, one or more proximity sensors may indicate whether the tailgate is closed, the tailgate assembly is closed, or both. In some embodiments, the control circuitry may perform a safety check (e.g., that latches are in a safe position), a system check (e.g., the battery has sufficient voltage or power, or that a fuse is intact), or other diagnostic (e.g., check that a key is in the auxiliary position or ON position) to determine the current state of the tailgate.

Step 2008 may include control circuitry determining whether to actuate a drop motion or a swing motion. In some embodiments, the control circuitry may determine whether to actuate a drop motion or a swing motion based on a current state of the tailgate assembly (e.g., determined at step 2006), or a portion thereof, based on a received input (e.g., from steps 2002 or 2004), based on any other suitable information, or based on any combination thereof. In some embodiments, the control circuitry may determine whether to activate a drop motion or a swing motion based on a predetermined table, database, or other information.

If the control circuitry determines to actuate the drop motion at step 2008, the control circuitry may proceed to step 2010, which may include control circuitry determining which direction to cause rotation in (e.g., up or down). In some embodiments, the direction may be indicated by which button is pressed (e.g., there are up and down buttons, position of a double throw toggle switch), which option is selected (e.g., a button on a key fob pressed by a user), or both. In some embodiments, the control circuitry may determine the direction based on input received from a sensor. For example, if the tailgate assembly is in a closed position as determined by a proximity switch, the control circuitry may determine to rotate the tailgate assembly down (e.g., to open the tailgate assembly and provide access to a vehicle bed). In some embodiments, the control circuitry may determine which direction to cause rotation in based on the current state of the tailgate assembly. For example, the control circuitry may determine the current state to be that the tailgate assembly is fully dropped down based on a limit switch, and accordingly, the control circuitry may determine to cause rotation upwards (e.g., to close the tailgate assembly).

Step 2012 may include control circuitry releasing one or more first latches. In some embodiments, control circuitry may send a signal for one or more latches to open. For example, the control circuitry may activate a relay to provide fused 12 V battery power to release a latch. In a further example, the control circuitry may provide 12 V battery power to release a cinch actuator (e.g., thereby allowing at least one motion). If one or more first latches is already released, or otherwise unlocked, step 2012 need not be performed.

Step 2014 may include control circuitry activating an actuator to rotate the tailgate assembly down, based on a determination at step 2010. In some embodiments, the control circuitry may apply power to the actuator by applying voltage to suitable pins of a relay (e.g., applying 12 V across the control pins), wherein suitable pins of the relay (e.g., +12 V power and ground) are wired to the actuator. In some embodiments, the control circuitry may generate a relatively low voltage and/or current control signal (e.g., 3.3 VDC, 5 VDC, 4-20 mA, a 5V pulse, or a 5 V PWM) to activate a relay (e.g., a mechanical relay, or a solid-state relay), a contactor, a transistor, any other suitable power electronics or components, or any combination thereof. In some embodiments, the control circuitry may generate a signal that is based at least in part on the determined direction of step 2010. For example, a relative polarity of two pins may change based on which direction the motion is to be in.

In some embodiments, control circuitry may determine not to perform step 2012, step 2014, or both. For example, if the tailgate is already swung down, then the control circuitry may determine not to perform step 2012, step 2014, or both (e.g., to prevent a damaging or dangerous configuration). In some embodiments, the control circuitry may, for example, first suitably actuate the tailgate assembly, or components thereof (e.g., a tailgate), to a fully closed position before activating the actuator to rotate the tailgate assembly down.

Step 2016 may include control circuitry de-activating the actuator at an end of travel (e.g., the tailgate assembly has dropped down completely). In some embodiments, a limit switch, a proximity switch, an electrical contact, an optical switch, an optical proximity sensor, a magnetic proximity sensor, a position encoder, or any other suitable indicator may provide an indication that an end of travel has been achieved. In some embodiments, the control circuitry may monitor the current draw, torque, impedance, or other values corresponding to the actuator and de-activate the actuator based on the monitoring. For example, as the tailgate assembly reaches an end of travel, the actuator may become more loaded as it actuates the tailgate assembly. Accordingly, the current draw may increase and the control circuitry may detect the increase and deactivate the actuator (e.g., removes power from suitable pins of a relay to shut off power to the actuator). In some embodiments, the control circuitry may deactivate the actuator at the end of travel, and correspondingly activate a cinch actuator to lock the tailgate assembly in place. An end of travel may include an intended stopping position (e.g., tailgate assembly fully dropped down), an intermediate position (e.g., based on a user input to stop by pressing a button, or a detent), any other suitable stopping position, or any combination thereof. For example, if the control circuitry detects a hindrance to rotation (e.g., a user is in the way, or some object is blocking the tailgate assembly, and actuator current increases), then the instant position may be determined to be the end of travel. In a further example, the control circuitry may detect an impact from a rotational position encoder (e.g., based on processing of the encoder signal) and accordingly determine the position of impact as the end of travel. In a further example, a cable, mechanical hard stop, or a detent may be used to more explicitly define the end of travel.

Step 2018 may include control circuitry activating an actuator to rotate the tailgate assembly up, based on a determination at step 2010. In some embodiments, the control circuitry may apply power to the actuator by applying voltage to suitable pins of a relay (e.g., applying 12 V across the control pins), wherein suitable pins of the relay (e.g., +12 V power and ground) are wired to the actuator. In some embodiments, the control circuitry may generate a relatively low voltage and/or current control signal (e.g., 3.3 VDC, 5 VDC, 4-20 mA, a 5V pulse, or a 5 V PWM) to activate a relay (e.g., a mechanical relay, or a solid-state relay), a contactor, a transistor, any other suitable power electronics or components, or any combination thereof. In some embodiments, the control circuitry may generate a signal that is based at least in part on the determined direction of step 2010. For example, a relative polarity of two pins may change based on which direction the motion is to be in.

In some embodiments, control circuitry may determine not to perform step 2018, step 2020, or both. For example, if the tailgate assembly is already fully closed, then the control circuitry may determine not to perform step 2018, step 2020, or both (e.g., to prevent a damaging or dangerous configuration).

Step 2020 may include control circuitry locking the tailgate assembly, in a closed position. In some embodiments, a limit switch, a proximity switch, an electrical contact, an optical switch, an optical proximity sensor, a magnetic proximity sensor, a position encoder, or any other suitable indicator may provide an indication that the end of travel has been achieved, and the tailgate assembly may be locked in place. In some embodiments, the control circuitry may activate a cinch actuator to lock the tailgate assembly in place. In some embodiments, the control circuitry may close a latch to lock the tailgate assembly in place. In some circumstances, if the tailgate assembly is unable to close completely (e.g., something is blocking the rotation motion), the control circuitry need not perform step 2020.

If the control circuitry determines to actuate the swing motion at step 2008, the control circuitry may proceed to step 2022 may include control circuitry determining which direction to swing (e.g., up or down). In some embodiments, the direction may be indicated by which button is pressed (e.g., there are up and down buttons, position of a double throw toggle switch), which option is selected (e.g., a button on a key fob pressed by a user), or both. In some embodiments, the control circuitry may determine the direction based on input received from a sensor. For example, if the tailgate is in a closed position as determined by a proximity switch, the control circuitry may determine to swing the tailgate assembly down (e.g., to open the tailgate and provide access to a vehicle bed). In some embodiments, the control circuitry may determine which direction to cause the swing motion in based on the current state of the tailgate. For example, the control circuitry may determine the current state to be that the tailgate is fully swung down based on a limit switch, and accordingly, the control circuitry may determine to cause a swing motion upwards (e.g., to close the tailgate against the post assembly).

Step 2024 may include control circuitry releasing one or more second latches. In some embodiments, control circuitry may send a signal for one or more latches to open. For example, the control circuitry may activate a relay to provide fused 12 V battery power to release a latch. In a further example, the control circuitry may provide 12 V battery power to release a cinch actuator (e.g., thereby allowing at least one motion). In some embodiments, the control circuitry may also release one or more third latches so that the tailgate is free to move (e.g., be actuated and undergo motion) relative to the post assembly.

Step 2026 may include control circuitry activating an actuator to swing the tailgate assembly down, based on a determination at step 2022. In some embodiments, the control circuitry may apply power to the actuator by applying voltage to suitable pins of a relay (e.g., applying 12 V across the control pins), wherein suitable pins of the relay (e.g., +12 V power and ground) are wired to the actuator. In some embodiments, the control circuitry may generate a relatively low voltage and/or current control signal (e.g., 3.3 VDC, 5 VDC, 4-20 mA, a 5V pulse, or a 5 V PWM) to activate a relay (e.g., a mechanical relay, or a solid-state relay), a contactor, a transistor, any other suitable power electronics or components, or any combination thereof. In some embodiments, the control circuitry may generate a signal that is based at least in part on the determined direction of step 2022. For example, a relative polarity of two pins may change based on which direction the motion is to be in.

Step 2028 may include control circuitry de-activating the actuator at an end of travel. In some embodiments, a limit switch, a proximity switch, an electrical contact, an optical switch, an optical proximity sensor, a magnetic proximity sensor, a position encoder, or any other suitable indicator may provide an indication that an end of travel in the swing motion has been achieved. In some embodiments, the control circuitry may monitor the current draw, torque, impedance, or other values corresponding to the actuator and de-activate the actuator based on the monitoring. For example, as the linkages reach an end of travel, the actuator may become more loaded as it actuates the tailgate. Accordingly, the current draw may increase and the control circuitry may detect the increase and deactivate the actuator (e.g., removes power from suitable pins of a relay to shut off power to the actuator). In some embodiments, the control circuitry may deactivate the actuator at the end of travel, and correspondingly activate a cinch actuator to lock the tailgate, at least one link, or at least one linkages, in place. An end of travel may include the intended stopping position (e.g., tailgate fully swung down), an intermediate position (e.g., based on a user input to stop by pressing a button), any other suitable stopping position, or any combination thereof. For example, if the control circuitry detects a hindrance to swinging (e.g., a user is in the way, or some object is stuck in the linkage, and actuator current increases), then the instant position may be determined to be the end of travel. In a further example, the control circuitry may detect an impact from a rotational position encoder coupled to a link and accordingly determine the position of impact as the end of travel. In a further example, a cable, mechanical hard stop, or a detent may be used to more explicitly define the end of travel.

In some embodiments, control circuitry may determine not to perform step 2024, step 2026, or both. For example, if the tailgate assembly is already dropped down, then the control circuitry may determine not to perform step 2024, step 2026, or both (e.g., to prevent a damaging or dangerous configuration). In some embodiments, the control circuitry may, for example, first suitably actuate the tailgate assembly, or components thereof (e.g., a tailgate), to a fully closed position before activating the actuator to swing the tailgate down.

Step 2030 may include control circuitry activating an actuator to swing the tailgate assembly up, based on a determination at step 2022. In some embodiments, the control circuitry may apply power to the actuator by applying voltage to suitable pins of a relay (e.g., applying 12 V across the control pins), wherein suitable pins of the relay (e.g., +12 V power and ground) are wired to the actuator. In some embodiments, the control circuitry may generate a relatively low voltage and/or current control signal (e.g., 3.3 VDC, 5 VDC, 4-20 mA, a 5V pulse, or a 5 V PWM) to activate a relay (e.g., a mechanical relay, or a solid-state relay), a contactor, a transistor, any other suitable power electronics or components, or any combination thereof. In some embodiments, the control circuitry may generate a signal that is based at least in part on the determined direction of step 2022. For example, a relative polarity of two pins may change based on which direction the motion is to be in.

Step 2032 may include control circuitry locking the tailgate. In some embodiments, a limit switch, a proximity switch, an electrical contact, an optical switch, an optical proximity sensor, a magnetic proximity sensor, a position encoder, or any other suitable indicator may provide an indication that the end of travel has been achieved, and the tailgate may be locked in place. In some embodiments, the control circuitry may activate a cinch actuator to lock the tailgate in place. In some circumstances, if the tailgate is unable to close completely (e.g., something is blocking the swinging motion), the control circuitry need not perform step 2032.

In some embodiments, control circuitry may determine not to perform step 2030, step 2032, or both. For example, if the tailgate is already locked against a post assembly, then the control circuitry may determine not to perform step 2030, step 2032, or both (e.g., to prevent a damaging or dangerous configuration).

It is contemplated that the steps or descriptions of FIG. 20 may be used with any other embodiments of this disclosure. In addition, the steps and descriptions described in relation to FIG. 20 may be done in alternative orders or in parallel to further the purposes of this disclosure. As another example, each of these steps may be performed in any suitable order or in parallel or substantially simultaneously to reduce lag or increase the speed of the system or method. Any of these steps may also be skipped or omitted from the process. In some embodiments, one or more steps may be performed by a user, and accordingly, need not be performed by control circuitry.

Figure 21:
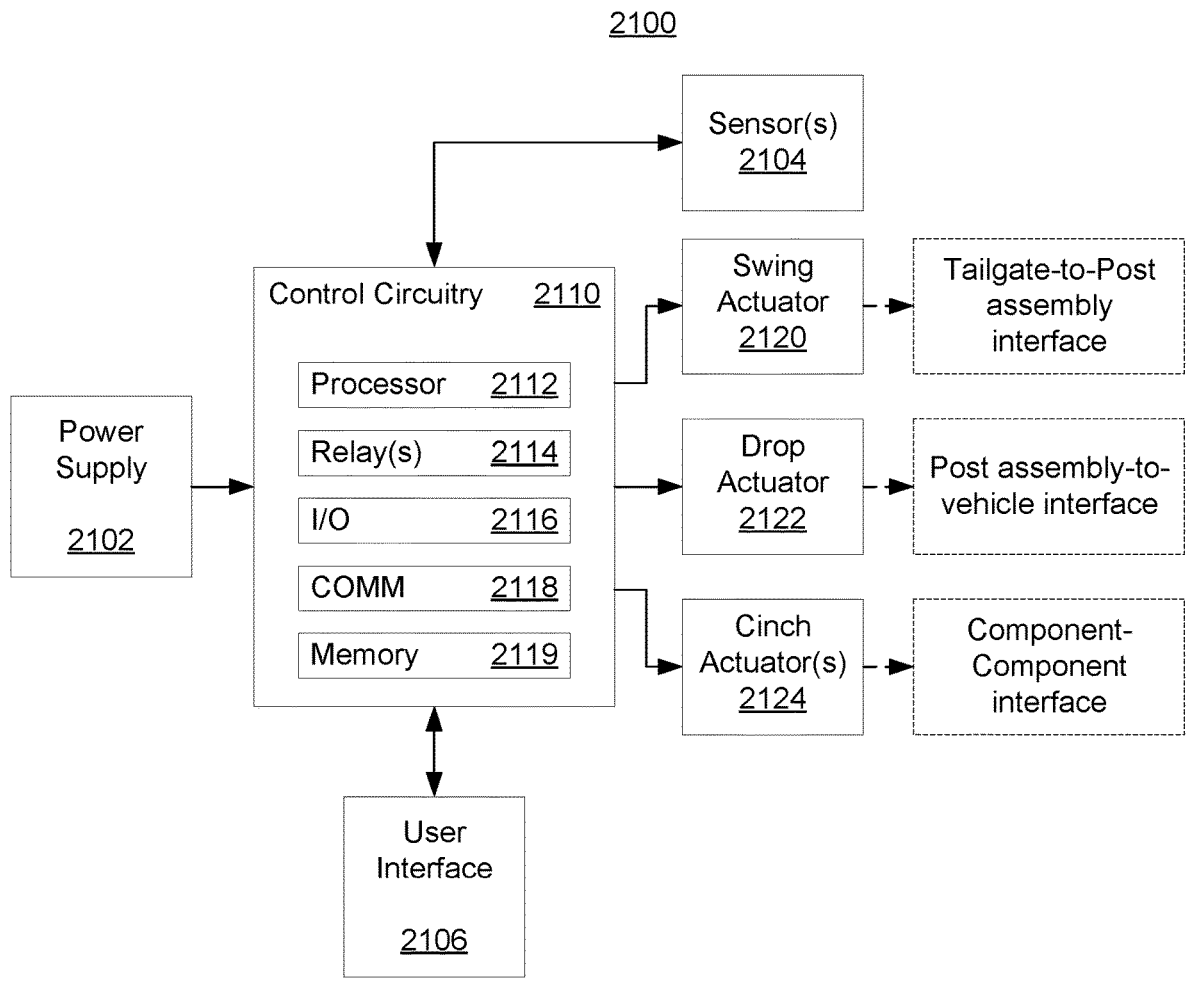
FIG. 21 shows a system diagram of an illustrative system including control circuitry, actuators, sensors, and a power supply, in accordance with some embodiments of the present disclosure.

FIG. 21 shows a system diagram of illustrative system 2100 including control circuitry 2110, swing actuator 2120, drop actuator 2122, cinch actuator 2124, sensors 2104, user interface 2106, and power supply 2102, in accordance with some embodiments of the present disclosure. Control circuitry 2110 may include a processor 2112, one or more relays 2114 (hereinafter referred to as relay(s) 2114), input/output 2116 (hereinafter referred to as I/O 2116), communication hardware 2118 (hereinafter referred to as COMM 2118), and memory 2119.

Control circuitry 2110 may include hardware, software, or both, implemented on one or more modules configured to provide control of a tailgate assembly. In some embodiments, processor 2112 may include one or more microprocessors, microcontrollers, digital signal processors, programmable logic devices, field-programmable gate arrays (FPGAs), application-specific integrated circuits (ASICs), etc., and may include a multi-core processor. In some embodiments, processor 2112 may be distributed across multiple separate processors or processing units, for example, multiple of the same type of processing units or multiple different processors. In some embodiments, control circuitry 2110 may execute instructions stored in memory for managing a swing and drop tailgate. Memory 2119 may be an electronic storage device that is part of control circuitry 2110. For example, memory may be configured to store electronic data, computer software, or firmware, and may include random-access memory, read-only memory, hard drives, optical drives, solid state devices, or any other suitable fixed or removable storage devices, and/or any combination of the same. Nonvolatile memory may also be used (e.g., to launch a boot-up routine and other instructions).

In some embodiments, control circuitry 2110 may be powered by power supply 2102. Power supply 2102 may include, for example, a car battery (e.g., a 12 V lead acid battery), a DC-DC converter, an AC power supply (e.g., generated by suitably inverting a DC power supply), any other power supply, any corresponding components (e.g., terminals, switches, fuses, and cables), or any combination thereof. In some embodiments, power supply 2102 may supply power to swing actuator 2120, drop actuator 2122, cinch actuator(s) 2124, sensors 2104, user interface 2106, control circuitry 2110, any other suitable systems or components, or any combination thereof.

User interface 2106 may include a push button, a toggle switch, a display screen (e.g., a touch screen), a key fob, a key-lock combination, any other suitable system or component for receiving input from a user or providing output to a user, or any combination thereof. In some embodiments, user interface 2106 may include a touchscreen on the dash of a vehicle, configured to receive input from user, and provide a display to the user. In some embodiments, user interface 2106 may include one or more buttons which may be pressed by a user. For example, the one or more buttons may include a button coupled to a switch, a button on a touchpad, any other suitable button which may be used by a user to make a selection, or any combination thereof. In some embodiments, a key fob may include one or more buttons, which when pressed by a user, may provide an indication to COMM 2118 of control circuitry 2110. In some embodiments, user interface 2106 may be implemented on a smartphone, tablet, or other portable device, which may communicate with control circuitry 2110 via COMM 2118. For example, a software application, or "app," may be implemented on a smartphone, with user-selectable options which may be communicated to COMM 2118 via a 3G network, WiFi, Bluetooth, or other suitable communication.

Sensor(s) 2104 may include one or more proximity switches, limit switches, position sensors, current sensors, voltage sensors, torque sensors, haptic sensors, any other suitable sensors, or any combination thereof. For example, sensor(s) 2104 may include an optical encoder, a magnetic encoder, a potentiometer, or other suitable device for determining a rotary position or speed. In a further example, sensor(s) 2104 may include a current sensor configured to measure current provided to one or more actuators (e.g., swing actuator 2120, drop actuator 2122, or cinch actuator(s) 2124).

Swing actuator 2120 may include, or be accompanied by, a rotary actuator (e.g., an AC motor, or a DC motor), a linear actuator (e.g., an electric solenoid, hydraulic actuator, or a pneumatic actuator), a brake, a clutch, a transmission (e.g., geared or belt-driven), a counterweight, a rotation element (e.g., a torsion spring or damper), any other suitable hardware, or any combination thereof. For example, swing actuator 2120 may include a stepper motor, a servo motor, an induction motor, or other type of motor. In a further example, swing actuator 2120 may include a DC motor and a gear drive. In a further example, swing actuator 2120 may include a brake to generate friction to control motion.

Drop actuator 2122 may include, or be accompanied by, a rotary actuator (e.g., an AC motor, or a DC motor), a linear actuator (e.g., an electric solenoid, hydraulic actuator, or a pneumatic actuator), a brake, a clutch, a transmission (e.g., geared or belt-driven), a counterweight, a rotation element (e.g., a torsion spring or damper), any other suitable hardware, or any combination thereof. For example, drop actuator 2122 may include a stepper motor, a servo motor, an induction motor, or other type of motor. In a further example, swing actuator 2122 may include a DC motor and a gear drive. In a further example, swing actuator 2122 may include a brake to generate friction to control motion.

Cinch actuator(s) 2124 may include, or be accompanied by, a rotary actuator (e.g., an AC motor, or a DC motor), a linear actuator (e.g., an electric solenoid, hydraulic actuator, or a pneumatic actuator), a brake, a clutch, a transmission (e.g., geared or belt-driven), a lock, a latch, any other suitable hardware, or any combination thereof. In some embodiments, a plurality of cinch actuator(s) 2124 may be included to, for example, cinch both sides of a tailgate to a post assembly, cinch both sides of a tailgate assembly to a vehicle, or both.

Illustrative system 2100 of FIG. 21 may be used to perform any or all of the illustrative steps of process 2000 of FIG. 20. Illustrative system 2100 of FIG. 21 may be used to control any of the tailgate assemblies shown in FIGS. 1-19, in accordance with the present disclosure.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A tailgate assembly comprising:
    a post assembly configured to be coupled to a vehicle by a hinge, wherein the post assembly is configured to rotate about a first axis of the hinge relative to the vehicle;
    at least one first latch configured to lock the post assembly to the vehicle;
    a tailgate coupled to the post assembly by at least one four-bar linkage, wherein the tailgate is configured to swing relative to the post assembly; and
    at least one second latch configured to lock the post assembly and the tailgate together as a substantially rigid body capable of rotating about the hinge.

2. The tailgate assembly of claim 1, wherein the at least one four-bar linkage comprises a double rocker linkage comprising two rocker arms, and wherein a respective axis of rotation of each of the two rocker arms is substantially parallel with the first axis of the hinge.

3. The tailgate assembly of claim 1, wherein:
    the post assembly is configured to rotate about the first axis of the hinge to a first lower position;
    the tailgate is configured to swing relative to the post assembly to a second lower position;
    the tailgate has a corresponding centroid; and
    the centroid of the tailgate in the second lower position is lower than the centroid of the tailgate in the first lower position.

4. The tailgate assembly of claim 3, wherein the tailgate is oriented substantially horizontal in the first lower position, and wherein the tailgate is oriented substantially vertical in the second lower position.

5. The tailgate assembly of claim 1, wherein:
    the post assembly is configured to rotate about the first axis of the hinge to a first lower position;
    the tailgate is configured to swing relative to the post assembly to a second position relative to the post assembly; and
    the tailgate is configured to achieve a third lower position, corresponding to the post assembly achieving the first lower position and the tailgate achieving the second position relative to the post assembly.

6. The tailgate assembly of claim 5, wherein:
    the tailgate has a corresponding centroid;
    when in the third lower position, the tailgate is oriented substantially horizontal; and
    when in the third lower position, the centroid of the tailgate is lower than when in the first lower position.

7. The tailgate assembly of claim 1, further comprising at least one torsion spring, wherein the at least one torsion spring is configured to provide a pre-load torque at at least one interface between two links of the at least one four-bar linkage.

8. The tailgate assembly of claim 1, further comprising at least one actuator, wherein the at least one actuator is configured to actuate the at least one four-bar linkage to cause the tailgate to swing relative to the post assembly.

9. The tailgate assembly of claim 8, wherein the at least one actuator is configured to be controlled by control circuitry.

10. The tailgate assembly of claim 9, further comprising a pushbutton electrically coupled to the control circuitry, wherein the at least one actuator is further configured to be controlled by the control circuitry based at least in part on the pushbutton being pressed.

11. The tailgate assembly of claim 9, further comprising at least one sensor, wherein the sensor is configured to sense a position of the post assembly relative to the vehicle, and wherein the at least one actuator is further configured to be controlled by the control circuitry based at least in part on the position.

12. The tailgate assembly of claim 1, further comprising at least one cinch actuator configured to aid in locking the post assembly and the tailgate together.

13. The tailgate assembly of claim 1, further comprising at least one rotational dampener, wherein the at least one rotational dampener is configured to dampen a motion of the at least one four-bar linkage.

14. The tailgate assembly of claim 1, further comprising at least one rotational dampener, wherein the at least one rotational dampener is configured to dampen a motion about the hinge.

15. A method for controlling motion of a tailgate assembly, wherein the tailgate assembly comprises:
    a post assembly coupled to a vehicle by a hinge, wherein the post assembly is configured to undergo a rotation about a first axis of the hinge relative to the vehicle;
    at least one first latch that locks the post assembly to the vehicle;
    a tailgate coupled to the post assembly by at least one four-bar linkage, wherein the at least one four-bar linkage is configured to allow the tailgate to undergo a swinging motion relative to the post assembly; and
    at least one second latch configured to lock the post assembly and the tailgate together as a substantially rigid body capable of rotating about the hinge, the method comprising:
    swinging the tailgate about the four-bar linkage when the second latch is unlocked and the first latch is locked.

16. The method of claim 15, further comprising determining, using control circuitry, that the first latch is locked.

17. The method of claim 15, further comprising rotating the tailgate assembly about the first axis of the hinge when the second latch is locked and the first latch is unlocked.

18. The method of claim 17, further comprising determining, using control circuitry, that the second latch is locked, wherein the rotating the tailgate assembly about the first axis of the hinge is based at least in part on the determining.

19. The method of claim 17, further comprising receiving, at control circuitry, a command to rotate the post assembly about the hinge, wherein rotating the post assembly about the hinge further comprises actuating, using the control circuitry, at least one actuator configured to actuate the hinge.

20. The method of claim 15, further comprising receiving, at control circuitry, a command to swing the tailgate about the at least one four-bar linkage, wherein swinging the tailgate about the at least one four-bar linkage further comprises actuating, using the control circuitry, at least one actuator configured to actuate the at least one four-bar linkage.

21. A vehicle comprising:
    a vehicle bed having a rear end; and
    a tailgate assembly arranged at the rear end of the vehicle bed, the tailgate assembly comprising:
        a post assembly coupled to the vehicle by a hinge, wherein the post assembly is configured to rotate about a first axis of the hinge relative to the vehicle;
        at least one first latch that locks the post assembly to the vehicle;
        a tailgate coupled to the post assembly by at least one four-bar linkage, wherein the tailgate is configured to swing relative to the post assembly; and at least one second latch configured to lock the post assembly and the tailgate together as a substantially rigid body capable of rotating about the hinge.

* * * * *